US012810398B2

(12) United States Patent
Kim et al.

(10) Patent No.: US 12,810,398 B2
(45) Date of Patent: Nov. 24, 2026

(54) GENERATIVE AI-BASED VIDEO OUTPAINTING WITH TEMPORAL AWARENESS

(71) Applicant: Samsung Electronics Co., Ltd., Suwon-si (KR)

(72) Inventors: Hong-Hoe Kim, Aliso Viejo, CA (US); Yingnan Zhu, Irvine, CA (US); Tomasz J. Palczewski, Danville, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 18/778,793

(22) Filed: Jul. 19, 2024

(65) Prior Publication Data

US 2025/0232498 A1 Jul. 17, 2025

Related U.S. Application Data

(60) Provisional application No. 63/621,526, filed on Jan. 16, 2024.

(51) Int. Cl.
*G06T 5/77* (2024.01)
*G06T 11/60* (2006.01)

(52) U.S. Cl.
CPC ................ *G06T 5/77* (2024.01); *G06T 11/60* (2013.01)

(58) Field of Classification Search
CPC .. G06T 11/60; G06T 5/77; G06T 3/40; H04N 7/0122
See application file for complete search history.

(56) References Cited

U.S. PATENT DOCUMENTS 9,036,089 B2 5/2015 Smolic et al.
11,367,199 B2 6/2022 Zhang et al.
11,758,082 B2 9/2023 Zhang et al.
(Continued)

FOREIGN PATENT DOCUMENTS

KR 10-2023-0034064 A 3/2023
KR 1020230085495 A 6/2023
WO 2023221093 A1 11/2023

OTHER PUBLICATIONS

International Search Report and Written Opinion of the International Searching Authority dated Dec. 19, 2024, in connection with International Application No. PCT/KR2024/013982, 10 pages.
(Continued)

*Primary Examiner* — Maurice L. Mcdowell, Jr.

(57) ABSTRACT

A method includes obtaining image frames that comprise a video, each of the image frames having a first aspect ratio, and selecting at least one of the image frames as a condition frame. The method further includes generating, from each condition frame based on an image outpainting model, an outpainted condition frame that has a second aspect ratio different from the first aspect ratio. The method further includes generating, from at least one of remaining image frames based on a video outpainting model and the outpainted condition frames, an outpainted target frame that has the second aspect ratio, each outpainted target frame having spatial consistency with the image frame from which it was generated and temporal consistency with neighboring outpainted frames in the video.

20 Claims, 18 Drawing Sheets

(56) References Cited

U.S. PATENT DOCUMENTS

| | | | | |
|---|---|---|---|---|
| 2013/0128121 | A1* | 5/2013 | Agarwala | H04N 13/221 348/E5.077 |
| 2015/0054853 | A1* | 2/2015 | Georgiev | H04N 1/00196 345/660 |
| 2022/0377416 | A1 | 11/2022 | Seo et al. | |
| 2023/0100652 | A1 | 3/2023 | Jang et al. | |
| 2023/0169628 | A1 | 6/2023 | Yu et al. | |
| 2023/0169632 | A1 | 6/2023 | Kulkarni et al. | |
| 2024/0273670 | A1* | 8/2024 | Cragg | G06T 5/77 |
| 2024/0331214 | A1* | 10/2024 | Zhou | G06T 11/60 |
| 2025/0111485 | A1* | 4/2025 | Da Costa De Azevedo | G06T 7/248 |
| 2025/0124626 | A1* | 4/2025 | Jefferson | G06T 11/60 |

OTHER PUBLICATIONS

Dehan, L., et al., "Complete and temporally consistent video outpainting," Proceedings of the IEEE/CVF Conference on Computer Vision and Pattern Recognition (CVPR) Workshops, Jun. 2022, pp. 687-695.

* cited by examiner

GENERATIVE AI-BASED VIDEO OUTPAINTING WITH TEMPORAL AWARENESS

CROSS-REFERENCE TO RELATED APPLICATION AND PRIORITY CLAIM

This application claims priority under 35 U.S.C. § 119(e) to U.S. Provisional Patent Application No. 63/621,526 filed on Jan. 16, 2024, which is hereby incorporated by reference in its entirety.

TECHNICAL FIELD

This disclosure relates generally to machine learning systems. More specifically, this disclosure relates to systems and methods for generative AI-based video outpainting with temporal awareness.

BACKGROUND

As users trend toward preferring bigger television (TV) and mobile device screens, TV and mobile screens with widescreen aspect ratios of 16:9 or wider on TV and 5:9 on mobile devices are becoming common. However, most video content is created in the 4:3 aspect ratio, and there is increasingly a gap between the aspect ratios of created content and the devices on which the content is displayed. As a result, users cannot enjoy their large screens and still watch the small aspect ratio (e.g., 4:3) content on their devices.

SUMMARY

This disclosure relates to systems and methods for facilitating generative AI-based video outpainting with temporal awareness.

In a first embodiment, a method includes obtaining image frames that comprise a video, each of the image frames having a first aspect ratio, and selecting at least one of the image frames as a condition frame. The method further includes generating, from each condition frame based on an image outpainting model, an outpainted condition frame that has a second aspect ratio different from the first aspect ratio. The method further includes generating, from at least one of remaining image frames based on a video outpainting model and the outpainted condition frames, an outpainted target frame that has the second aspect ratio, each outpainted target frame having spatial consistency with the image frame from which it was generated and temporal consistency with neighboring outpainted frames in the video.

In a second embodiment, an electronic device comprises a processor configured to obtain image frames that comprise a video, each of the image frames having a first aspect ratio and select at least one of the image frames as a condition frame. The processor is further configured to generate, from each condition frame based on an image outpainting model, an outpainted condition frame that has a second aspect ratio different from the first aspect ratio, and to generate, from at least one of remaining image frames based on a video outpainting model and the outpainted condition frames, an outpainted target frame that has the second aspect ratio, each outpainted target frame having spatial consistency with the image frame from which it was generated and temporal consistency with neighboring outpainted frames in the video.

In a third embodiment, a non-transitory computer readable medium contains instructions that when executed cause at least one processor of an electronic device to obtain image frames that comprise a video, each of the image frames having a first aspect ratio and select at least one of the image frames as a condition frame. The instructions when executed further cause the at least one processor to generate, from each condition frame based on an image outpainting model, an outpainted condition frame that has a second aspect ratio different from the first aspect ratio, and to generate, from at least one of remaining image frames based on a video outpainting model and the outpainted condition frames, an outpainted target frame that has the second aspect ratio, each outpainted target frame having spatial consistency with the image frame from which it was generated and temporal consistency with neighboring outpainted frames in the video.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
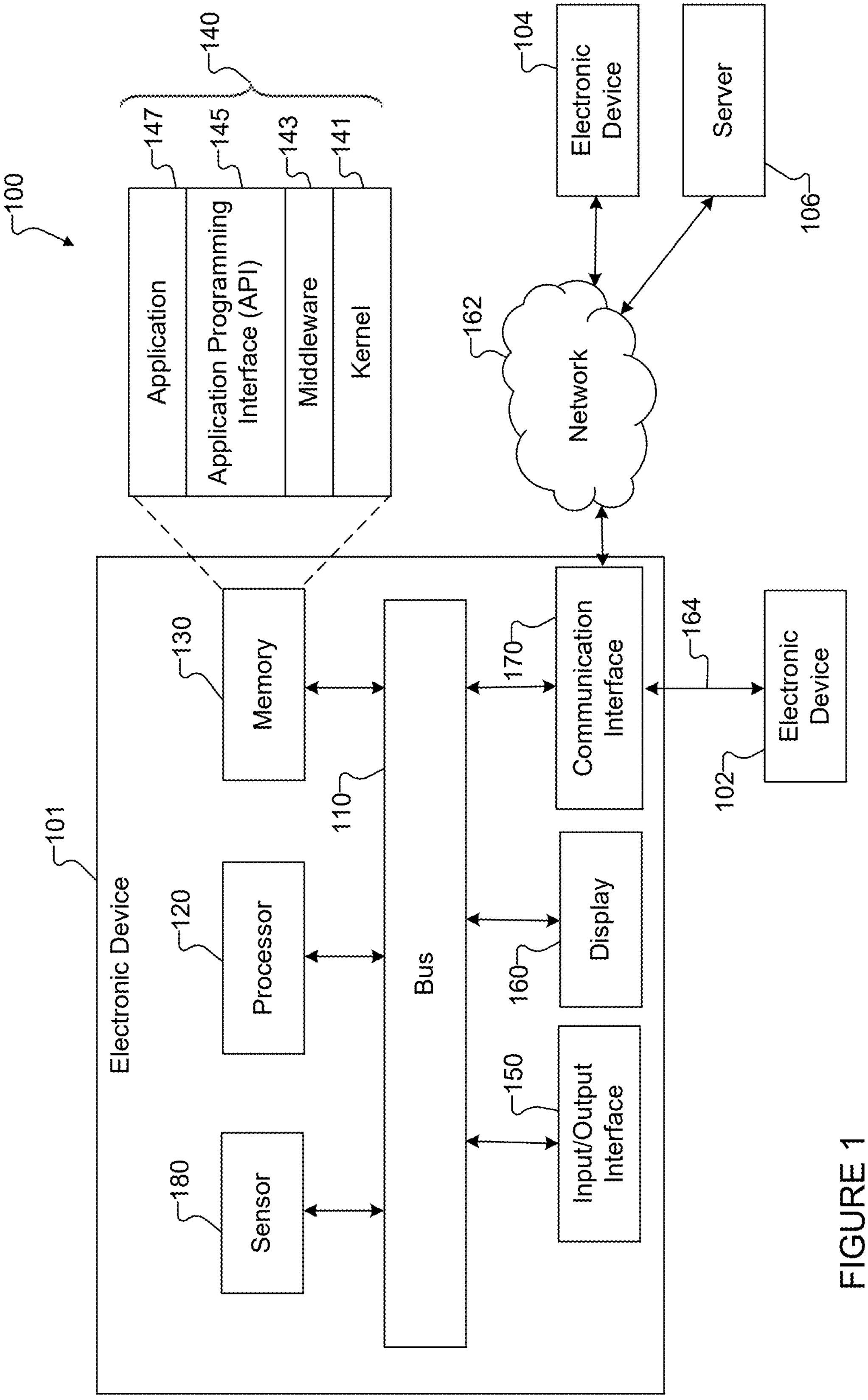
FIG. 1 illustrates an example network configuration including an electronic device in accordance with this disclosure.

FIGS. 1 through 16, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, as users trend toward preferring bigger television (TV) and mobile device screens, TV and mobile screens with widescreen aspect ratios of 16:9 or wider on TV and 5:9 on mobile devices are becoming common. However, most video content is created in the 4:3 aspect ratio, and there is increasingly a gap between the aspect ratios of created content and the devices on which the content is displayed. As a result, users cannot enjoy their large screens and still watch the small aspect ratio (e.g., 4:3) content on their devices.

One possible solution is for content creators to make screen-resolution-specific content, such as 16:9 or 5:9 content. However, this requires extensive manual effort on the part of content creators. Another possible solution is utilizing a generative artificial intelligence (GenAI) outpainting technique, which expands the outer pixels in original images. For example, Stable Diffusion is the State Of The Art (SOTA) outpainting research and the study expands an image to a bigger size. However, the research cannot be applied to the video domain because the study solely considers spatial consistency in an image and does not consider temporal consistency among neighbor frames in a video. As a result, outpainting videos generated using present SOTA techniques have a flickering issue.

There is a thus gap between the aspect ratio that most video content is produced in (typically 4:3) and the aspect ratios of increasingly popular widescreen devices (typically 16:9 for TVs and 5:9 for mobile device screens). When displaying smaller aspect ratio (e.g., 4:3) video content on a larger aspect ratio (e.g., 16:9 or 5:9) screen, either screen space is wasted or the content is stretched out of proportion to fit the larger aspect ratio. It would be preferable to expand the video content to fill the larger aspect ratio screen in a more organic way.

A similar issue exists for video content that is created in a larger aspect ratio than a device's display. When content in a large aspect ratio (e.g., 16:9) is displayed on a smaller aspect ratio screen (e.g., 4:3), it is either cropped, "letterboxed", or compressed out of proportion to fit the smaller aspect ratio. A related issue exists when devices are used in, e.g., a portrait orientation to view content that is created for the landscape orientation, as each orientation has a different aspect ratio (e.g., a landscape orientation with 16:9 aspect ratio and a portrait orientation with 9:16 aspect ratio). It would be preferable to expand the video content to fill, e.g., the letterbox area of the smaller aspect ratio (or different orientation) screen in a more organic way.

Additionally, newer devices have increasingly high resolution (e.g., 4K or 8K UHD) displays. However, there is a cost barrier for content creation at these high resolutions as compared to content creation at lower resolutions (e.g., 1080p). As a result, even content that is produced in a large aspect ratio (e.g., 16:9) is often produced at lower resolutions (e.g., 1080p). When displaying lower resolution (e.g., 1080p) video content on a higher resolution (e.g., 4K or 8K) screen, the full capabilities of the screen will go unused. It would be preferable to increase the resolution of the video content to fully take advantage of the higher resolution screen.

The above discussed problems have a common factor: more pixels of content are needed to fill unused pixels of a display. GenAI outpainting is a technique that generates additional pixels at the outer edge of an image to make the image larger. Existing outpainting techniques (such as Stable Diffusion) are designed to maintain spatial consistency with the original image, meaning that the original image and the expanded image (with the newly generated pixels) have consistent background objects and main objects. Thus, the outpainted image should look like an organic extension of the original image. If these existing outpainting techniques are applied to image frames of a video, however, a flaw becomes apparent: neighboring frames of the video are not considered when generating the outpainted portions of any individual frame. As a result, while the outpainted portions of each individual frame will have spatial consistency with the original portion of that frame, the outpainted portions of neighboring frames will not be consistent with each other (i.e., there is not temporal consistency between the outpainted portions of neighboring frames). In practice, this means that the outpainted portions of a video generated using existing outpainting techniques will exhibit unnatural effects as objects may appear, disappear, or jump around between frames.

Embodiments of the present disclosure provide devices and methods for outpainting video content into a different aspect ratio—that is, devices and methods for generating additional pixels such that the outpainted video content has more pixels than the original video, and thus can utilize unused pixels of a display—while maintaining both spatial consistency and temporal consistency (also referred to as spatio-temporal consistency) between frames of the video content. For ease of explanation, the embodiments of the present disclosure are discussed in terms of aspect ratios such as 16:9 and 4:3. However, it is understood that the same techniques may be applied to generate any outpainted video content having more pixels than the original video content while maintaining spatio-temporal consistency between frames.

Note that while some of the embodiments discussed below are described in the context of use in consumer electronic devices (such as smartphones and smart TVs), this is merely one example. It will be understood that the principles of this disclosure may be implemented in any number of other suitable contexts and may use any suitable device or devices. Also note that while some of the embodiments discussed below are described based on the assumption that one device (such as a server) performs training of a machine learning model that is deployed to one or more other devices (such as one or more consumer electronic devices), this is also merely one example. It will be understood that the principles of this disclosure may be implemented using any number of devices, including a single device that both trains and uses a machine learning model. In general, this disclosure is not limited to use with any specific type(s) of device(s).

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to generative AI-based video outpainting with temporal awareness. For example, as described below, the processor 120 may receive and process inputs (such as image frames of an original video having an original aspect ratio, and a desired new aspect ratio) and perform video outpainting using the inputs while maintaining spatio-temporal consistency. The processor 120 may also instruct other devices to perform certain operations or display content on one or more displays 160. The processor 120 may further receive inputs (such as data samples to be used in training machine learning models) and manage such training by inputting the samples to the machine learning models, receive outputs from the machine learning models, and execute learning functions (such as loss functions) to improve the machine learning models.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to generative AI-based video outpainting with temporal awareness. For example, the application 147 includes one or more applications supporting the receipt of original video frames having an original aspect ratio, receipt of a desired new aspect ratio, and executing tasks related to scene detection and image grouping, scene summary generation, key (or condition) frame selection, and outpainting of condition frames and non-condition frames while maintaining spatio-temporal consistency. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 may perform various operations related to machine learning speaker verification. For example, the server 106 may receive and process inputs (such as image frames of an original video having an original aspect ratio, and a desired new aspect ratio) and perform video outpainting using the inputs while maintaining spatio-temporal consistency. The server 106 may also instruct other devices to perform certain operations or display content on one or more displays 160. The server 106 may further receive inputs (such as data samples to be used in training machine learning models) and manage such training by inputting the samples to the machine learning models, receive outputs from the machine learning models, and execute learning functions (such as loss functions) to improve the machine learning models.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
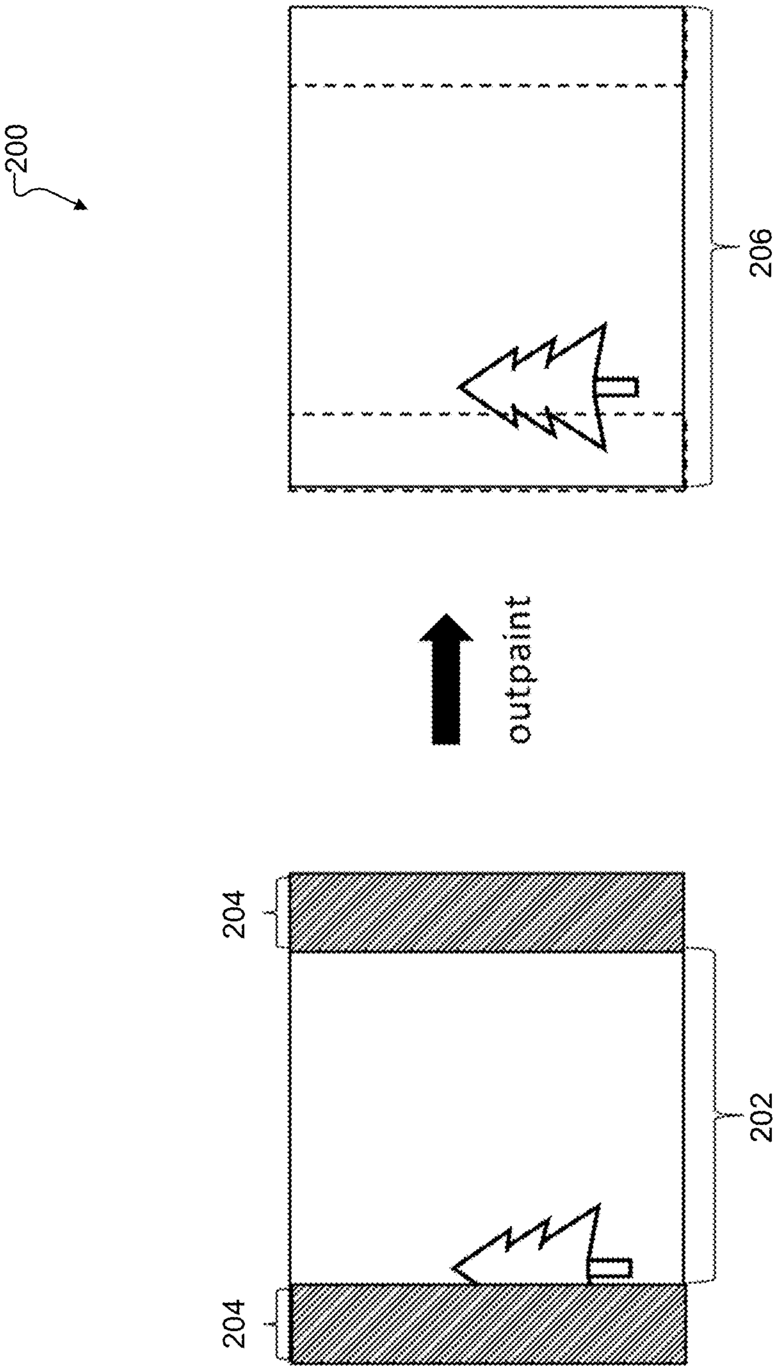
FIG. 2 illustrates an example of image outpainting in accordance with this disclosure.

FIG. 2 illustrates an example 200 of image outpainting in accordance with this disclosure. As shown in FIG. 2, an original image 202 has a first aspect ratio (e.g., 4:3), which is smaller than a desired second aspect ratio (e.g., 16:9). The masks 204 represent an area in which pixels need to be generated to reach the desired second aspect ratio.

In the example 200, outpainting is used to generate the outpainted image 206, having the second aspect ratio (e.g., 16:9), from the original image 202, while maintaining spatial consistency with the original image 202. That is, the outpainted image 206 has background objects (e.g., trees, clouds, snow, buildings, etc.) and subjects or main objects (e.g., parts of subjects such as faces, hats, gloves, snowboards, ski goggles, bikes, cars, etc.) that are consistent with the objects in the original image 202.

Figure 3:
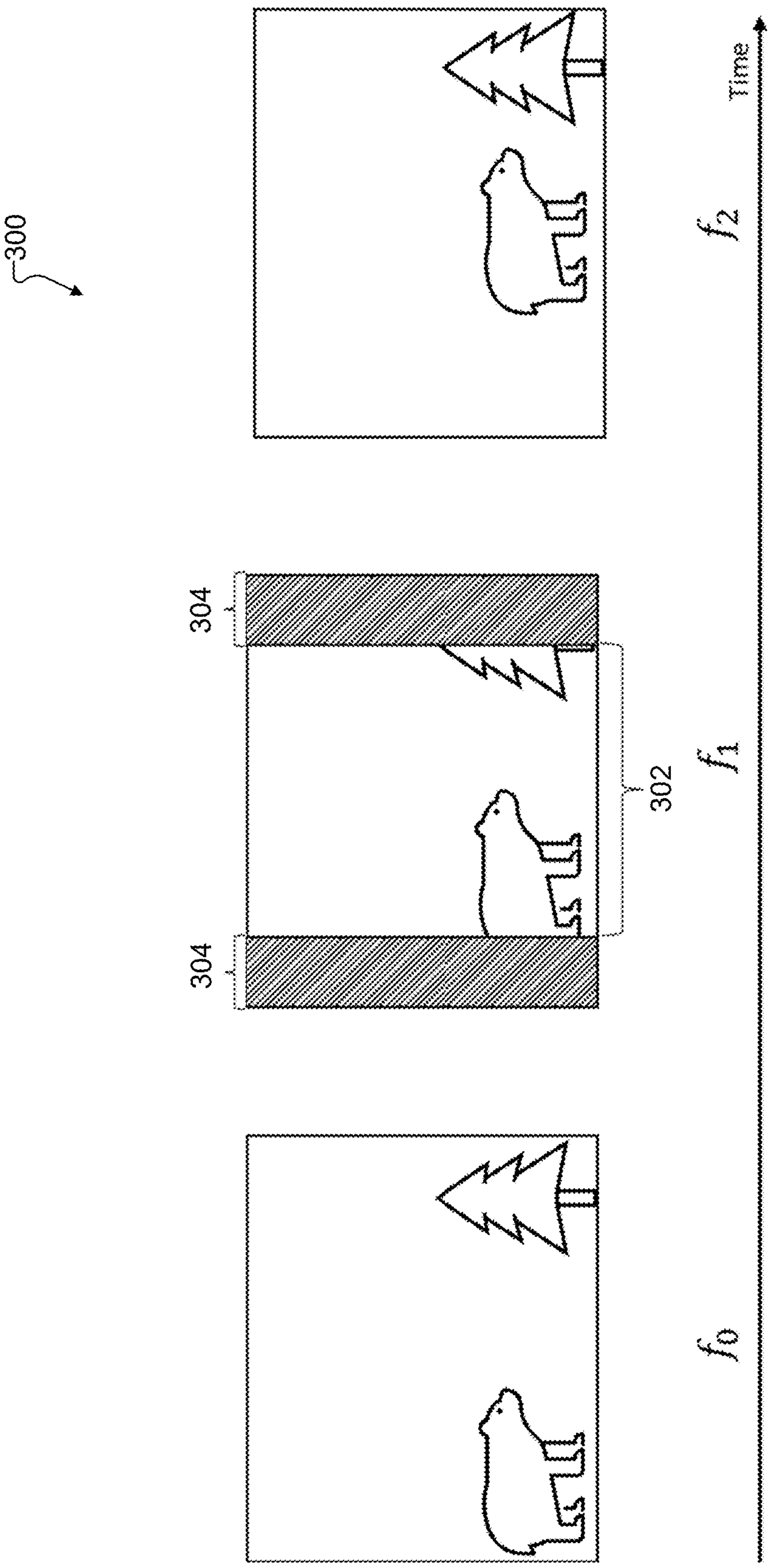
FIG. 3 illustrates an example of video outpainting in accordance with this disclosure.

FIG. 3 illustrates an example 300 of video outpainting in accordance with this disclosure. A video consists of a series of images (called frames) which have a temporal relationship with each other. As shown in FIG. 3, frame f0 is followed in time by frame f1, which is followed by frame f2, and so on. In various embodiments of the present disclosure, a "target frame" refers to a frame of a video which is targeted for outpainting to a different aspect ratio.

In example 300, frame $f_1$ is a target frame—it consists of an original frame 302 that has a first aspect ratio (e.g., 4:3). Frames $f_0$ and $f_2$ have a second aspect ratio (e.g., 16:9) that is different than the first aspect ratio of target frame $f_1$. In some embodiments, frames $f_0$ and $f_2$ have already been outpainted from the first aspect ratio to the second aspect ratio. By outpainting the masked areas 304, an outpainted target frame $f_1$ can be generated at the second aspect ratio. When the masked areas 304 are outpainted, however, temporal consistency should be maintained between frame $f_1$ and frames $f_0$ and $f_2$—that is, the outpainted frame $f_1$ should have consistent object motion with its neighbor frames $f_0$ and $f_2$. In example 300, a bear is in each frame and is moving from left to right over time. Thus, the outpainting of areas 304 should maintain consistent motion of the bear between frames.

Figure 4:
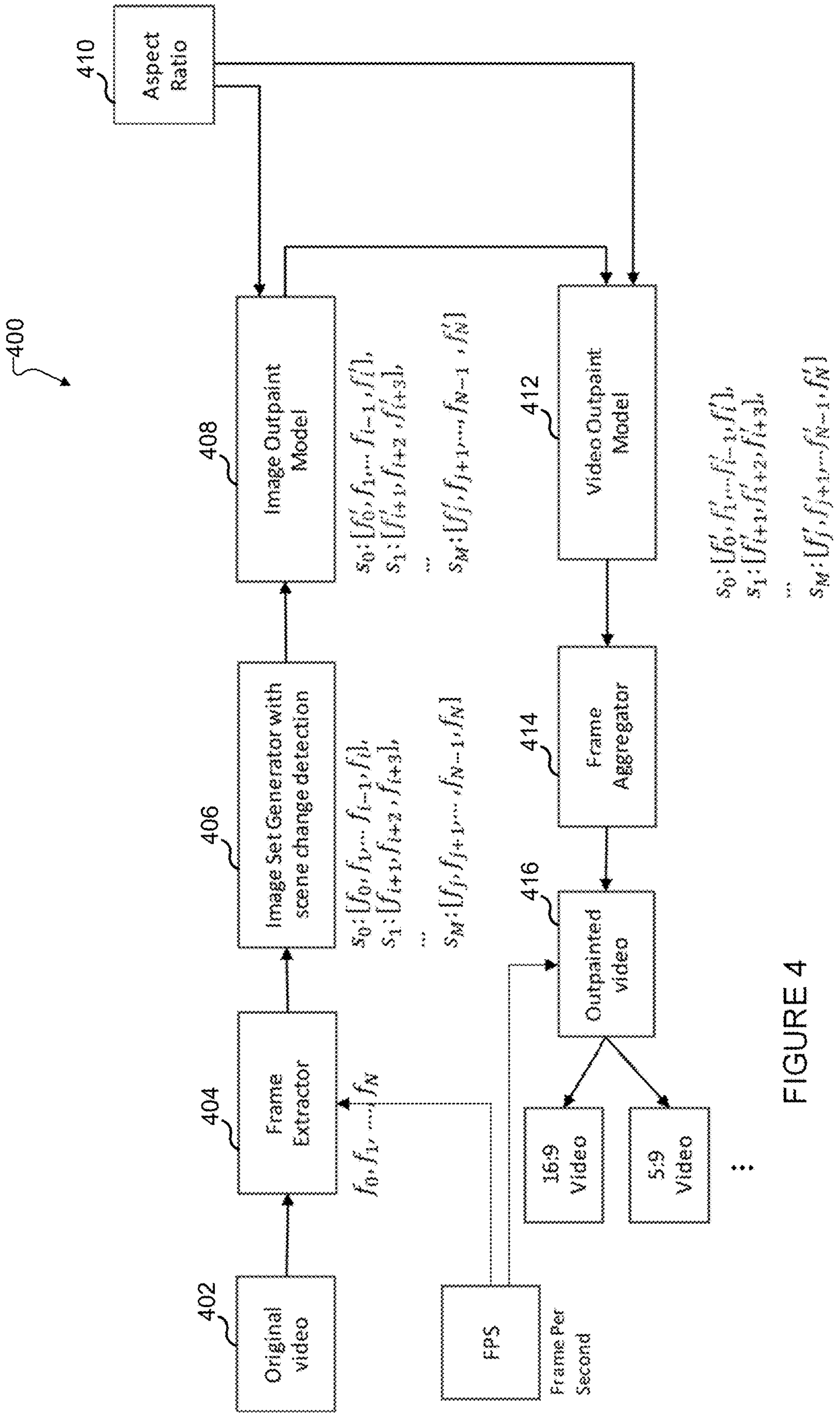
FIG. 4 illustrates an example system architecture supporting video outpainting with spatio-temporal consistency in accordance with this disclosure.

FIG. 4 illustrates an example system architecture 400 supporting video outpainting with spatio-temporal consistency in accordance with this disclosure. For ease of explanation, the architecture 400 shown in FIG. 4 is described as being implemented on or supported by the electronic device 101 in the network configuration 100 of FIG. 1. However, the architecture 400 shown in FIG. 4 could be used with any other suitable device(s) and in any other suitable system(s), such as when the architecture 400 is implemented on or supported by the server 106.

As shown in FIG. 4, the system operates on an original video 402, which is comprised of a number of frames (i.e., images) having a first aspect ratio (e.g., 4:3). A frame extractor 404 extracts the frames from the original video 402 based on the frames per second (FPS) at which the video 402 was created. In this example, N frames referred to as $[f_0, f_1, \ldots, f_N]$ are extracted from the video 402.

An image set generator 406 may be used to group frames into a number of sets (e.g., M sets designated $s_0, s_1, \ldots, s_M$), where each set of frames are, for example, one scene of the video. That is, each set of frames portrays similar objects, and therefore spatio-temporal consistency should be maintained between frames in the set. By the same token, when there is a scene change in the video 402 the objects included in the last frame of one scene are likely to be different from the objects included in the first frame of the following scene, and therefore spatio-temporal consistency should not be maintained between frames belonging to different scenes of the video.

Next, one or more condition frames (also referred to as key frames) are selected from each image set. These condition frames may be frames that represent the image set (e.g., the scene) well. That is, the condition frames are good representatives of the objects and environments portrayed across the frames of the image set. In this example, the first and last frames of each image set are used as condition frames (e.g., frames $f_0$ and $f_i$ are the condition frames of image set $s_0$).

The image outpaint model 408 outpaints each condition frame to a desired second aspect ratio 410 (e.g., 16:9) while maintaining spatial consistency with the corresponding original condition frame. For example, condition frames $f_0$ and $f_i$ of image set $s_0$ are outpainted to generate outpainted condition frames $f'_0$ and $f'_i$, respectively. The image outpaint model 408 may be a machine learning (ML) model such as a Stable Diffusion model.

The video outpaint model 412 then outpaints the remaining frames (i.e., the non-condition frames) of each image set to the desired second aspect ratio 410 while maintaining spatio-temporal consistency with other frames of the image set. That is, each outpainted non-condition frame (for example, frames $[f_1, \ldots, f_{i-1}]$ of image set $s_0$) has spatial consistency with the counterpart original frame and temporal consistency with other frames in the image set (such as the temporally neighboring frames, or the condition frames). The video outpaint model 412 utilizes the outpainted condition frames generated by the image outpaint model 408 to achieve temporal consistency, as described further below.

A frame aggregator 414 is then used to assemble the complete set of outpainted frames into an outpainted video 416 that has the desired second aspect ratio 410.

Although FIG. 4 illustrates one example of a system architecture 400, supporting video outpainting with spatio-temporal consistency, various changes may be made to FIG. 4. For example, various components and functions in FIG. 4 may be combined, further subdivided, replicated, or rearranged according to particular needs. Also, one or more additional components and functions may be included if needed or desired.

Figure 5:
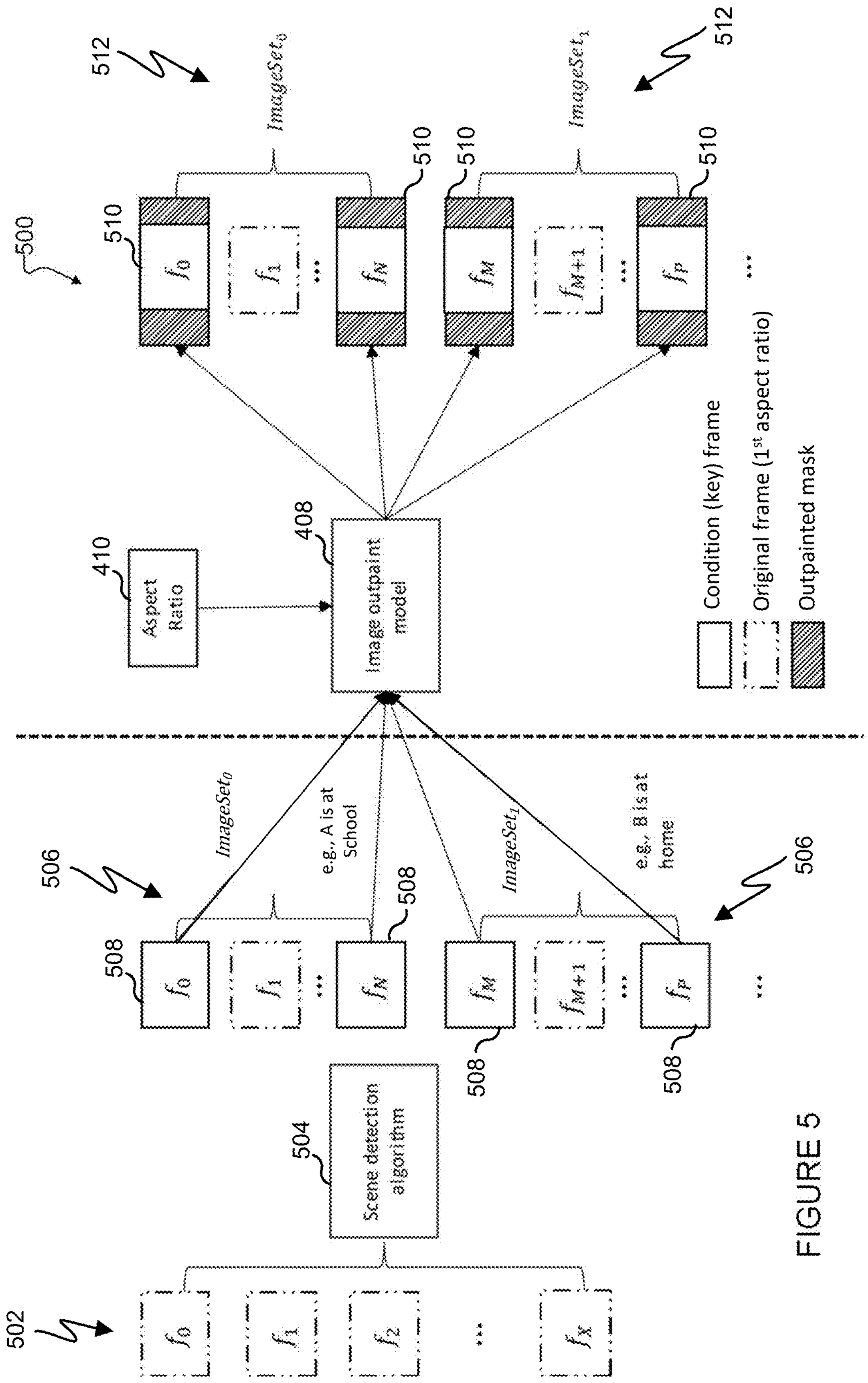
FIG. 5 illustrates an example process for image set generation with scene detection and condition frame outpainting in accordance with this disclosure.

FIG. 5 illustrates an example process 500 for image set generation with scene detection and condition frame outpainting in accordance with this disclosure. The process 500 may be performed by the image set generator 406 and image outpaint model 408 of FIG. 4.

The image set generator 406 takes as input a set of original frames 502 (e.g., frames $[f_0, \ldots, f_X]$) that correspond to the original video having a first aspect ratio. A scene detection algorithm 504 then identifies different scenes of the original video within the frames $[f_0, \ldots f_X]$ and groups frames belonging to those scenes together into image sets 506 (e.g., ImageSet0 comprising $[f_0, \ldots, f_N]$ corresponding to a scene set in a school, ImageSet1 comprising $[f_M, \ldots, f_p]$ corresponding to another scene set in a home, etc.). For example, an algorithm such as scenedetect may be used to identify scene changes from one frame to the next.

As described above with respect to FIG. 4, one or more condition frames 508 are selected from each image set 506 (e.g., frames $f_0$ and $f_N$ from ImageSet0), and the image outpaint model 408 (e.g., a stable diffusion model) then operates on those condition frames to generate outpainted condition frames 510 having the second aspect ratio 410. The resulting output image set 512 thus contains the outpainted condition frames 510 that correspond to the original condition frames 508 of the image set 506, as well as the remaining original frames 502 of the image set 506.

Although FIG. 5 illustrates one example of a process 500 for image set generation with scene detection and condition frame outpainting, various changes may be made to FIG. 5. For example, various components and functions in FIG. 5 may be combined, further subdivided, replicated, or rearranged according to particular needs. Also, one or more additional components and functions may be included if needed or desired.

Figure 6:
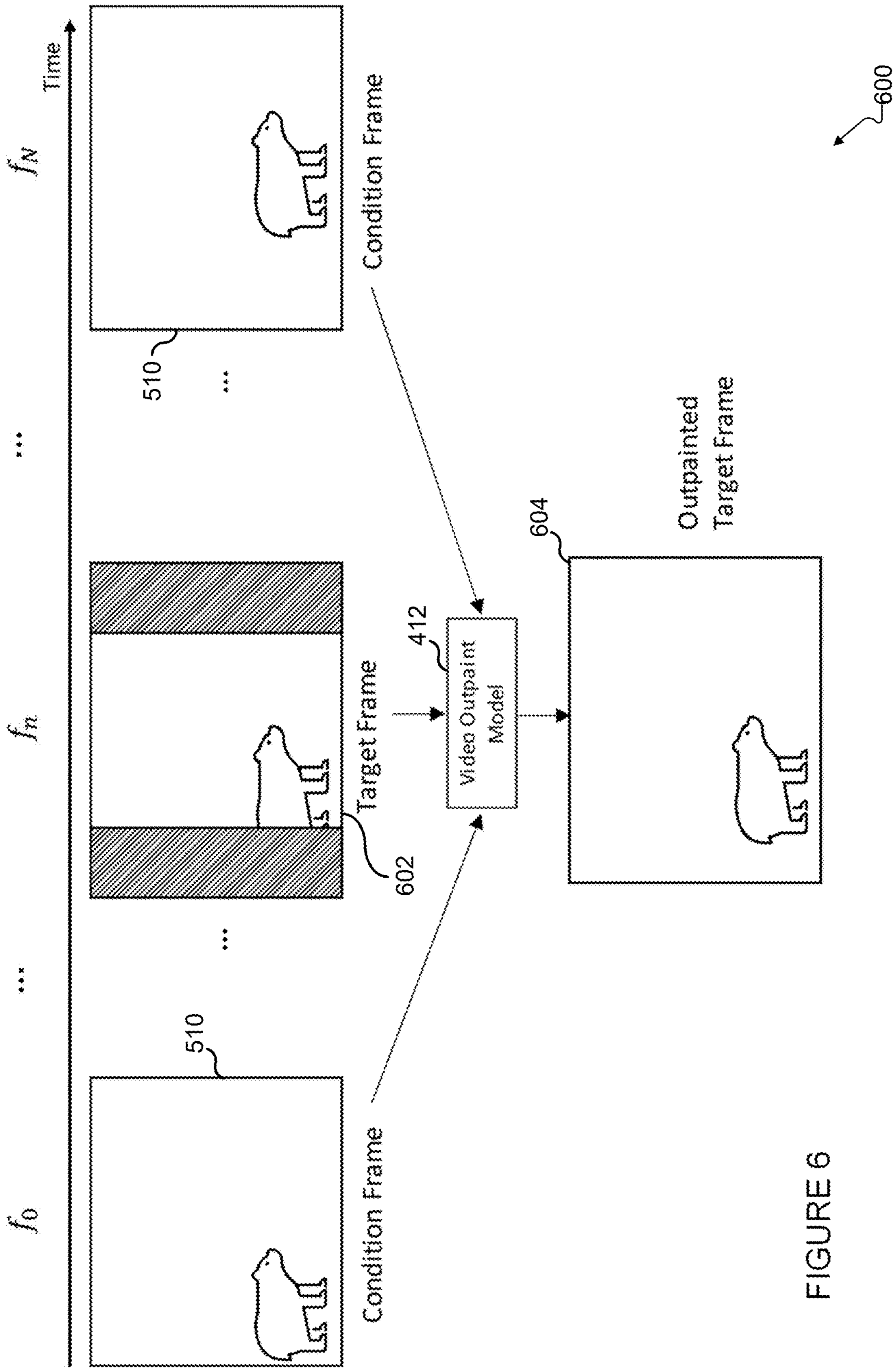
FIG. 6 illustrates an example of the functionality of a video outpaint model in accordance with this disclosure.

FIG. 6 illustrates an example 600 of the functionality of a video outpaint model in accordance with this disclosure. The example 600 may correspond to the functionality of the video outpaint model 412 of FIG. 4.

As shown in FIG. 6, outpainted condition frames 510 (generated by the image outpaint model 408) are used by the video outpaint model 412 to outpaint a target frame 602 from the first aspect ratio to the desired second aspect ratio 410, resulting in outpainted target frame 604. The video outpaint model 412 maintains spatial consistency between the outpainted target frame 604 and the original target frame 602. Additionally, by utilizing the condition frames 510 that correspond to the same scene as the target frame 602, the video outpaint model 412 maintains temporal consistency between the outpainted target frame 604 and the outpainted condition frames 510 (and other outpainted frames of the same image set).

It is understood that this is only an example, and any number of condition frames may be used in this process. For example, the outpainted target frame 604 itself may be used as an outpainted condition frame for the purposes of outpainting other target frames (which are not illustrated in FIG. 6). Similarly, each other outpainted target frame may be used as a condition frame for the purposes of outpainting remaining target frames.

Figure 7:
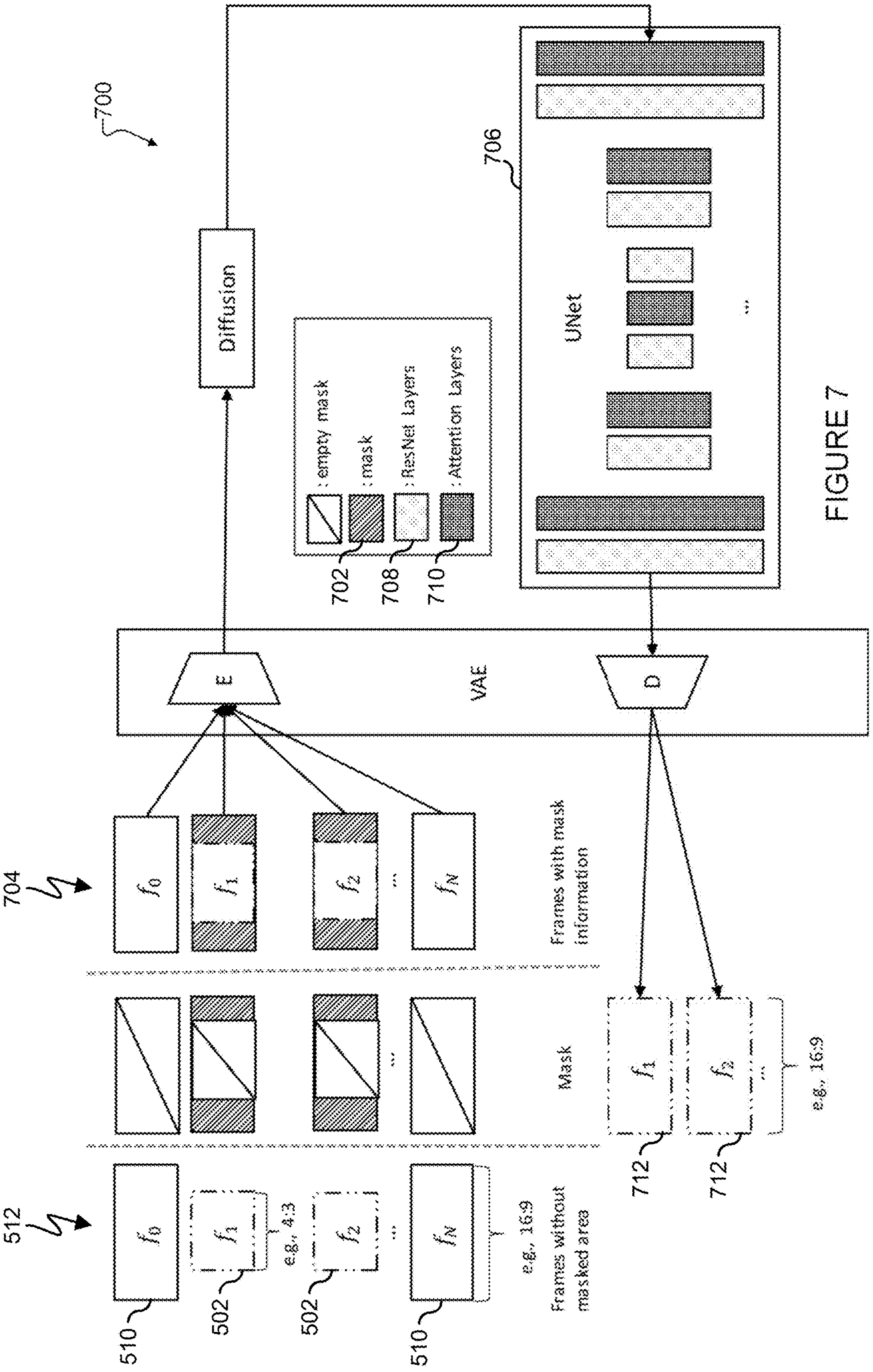
FIG. 7 illustrates an example video outpainting model architecture in accordance with this disclosure.

FIG. 7 illustrates an example video outpainting model architecture 700 in accordance with this disclosure. The architecture 700 may correspond to the video outpaint model 412 of FIG. 4. For ease of explanation, the architecture 700 shown in FIG. 7 is described as being implemented on or supported by the electronic device 101 in the network configuration 100 of FIG. 1. However, the architecture 700 shown in FIG. 7 could be used with any other suitable device(s) and in any other suitable system(s), such as when the architecture 700 is implemented on or supported by the server 106.

The video outpaint model 412 takes as inputs a set of target frames and one or more condition frames associated with the target frames. For example, an output image set 512 (as illustrated in FIG. 5) of the image outpaint model 408 of FIG. 4 may serve as the input to the video outpaint model 412, where the image set 512 includes one or more outpainted condition frames 510 having the desired second aspect ratio 410 (e.g., 16:9) and one or more original target frames 502 having the first aspect ratio (e.g., 4:3). For ease of explanation, the below description of the architecture 700 will assume one image set 512 as the input. However, it is understood that this is only an example, and multiple image sets may be outpainted in parallel using the architecture 700 for the video outpaint model 412.

As shown in FIG. 7, a set of outpainting masks 702 may be applied to the original target frames 502, where the masks 702 represent the additional pixels that need to be generated by the video outpaint model 412 and added to the corresponding original target frame 502 to generate an outpainted target frame having the desired second aspect ratio 410. A resulting masked image set 704 (that is, a set of frames having mask information associated with any frames needing outpainting) is then encoded (e.g., using a variational autoencoder (VAE)) to reduce the dimensionality of the masked image set 704, passed through a diffusion model to introduce noise, and passed to a U-Net 706. The U-Net 706 is comprised of a number of ResNet layers 708 and attention layers 710. Attention layers 710 are described further below with respect to FIG. 8.

Using the outpainted condition frames 510 (that is, the data corresponding to the outpainted condition frames 510 after encoding and diffusion), the U-NET 706 outpaints the masked portion of each original target frame 502. The output of the U-Net 706 is then decoded (e.g., using the variational autoencoder (VAE)) to restore the original dimensionality of the image set, resulting in outpainted target frames 712 that have the desired second aspect ratio 410 while maintaining spatial consistency with the original target frames 502 and temporal consistency with the other outpainted frames of the image set.

Although FIG. 7 illustrates one example of a video outpainting model architecture 700, various changes may be made to FIG. 7. For example, various components and functions in FIG. 7 may be combined, further subdivided, replicated, or rearranged according to particular needs. Also, one or more additional components and functions may be included if needed or desired.

Figure 8:
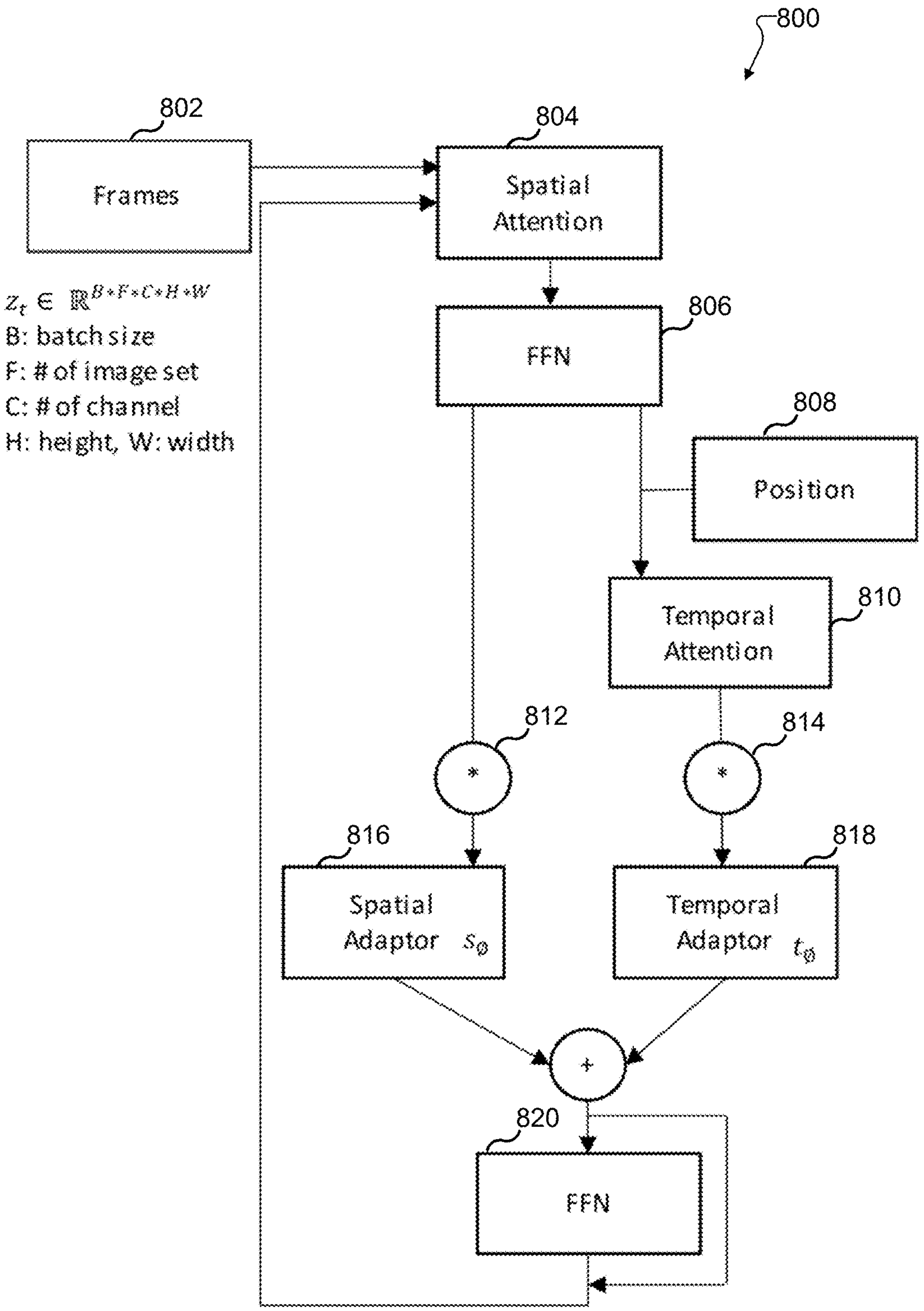
FIG. 8 illustrates an example implementation of an attention layer for facilitating outpainting with spatio-temporal consistency in accordance with this disclosure.

FIG. 8 illustrates an example implementation of an attention layer 800 for facilitating outpainting with spatio-temporal consistency in accordance with this disclosure. The attention layer 800 may correspond to an attention layer 710 of the U-Net 706 of FIG. 7. However, it is understood that the attention layer 800 may be implemented in any other suitable architecture. For ease of explanation, the attention layer 800 shown in FIG. 8 is described as being implemented on or supported by the electronic device 101 in the network configuration 100 of FIG. 1. However, the attention layer 800 shown in FIG. 8 could be used with any other suitable device(s) and in any other suitable system(s), such as when the attention layer 800 is implemented on or supported by the server 106.

The attention layer 800 may be referred to as a spatio-temporal attention layer with adaptors. The attention layer 800 includes, in part, a spatial attention layer 804, a temporal attention layer 810, a spatial adaptor 816, and a temporal adaptor 818.

The attention layer 800 operates on an input set of frames 802, such as that input to the U-Net 706 of FIG. 7. The input frames 802 are designated as $z_t \in \mathbb{R}^{B*F*C*H*W}$, where B is batch size, F is number of images in the set, C is number of channels, H is height, and W is width.

The spatial attention layer 804 operates on a single target frame at a time, taken from the input frames 802. The spatial attention layer 804 performs outpainting on each target frame (i.e., a frame that has a masked area associated with it) while maintaining spatial consistency. For each target frame, this attention layer utilizes the non-masked pixel information of the frame to determine how to outpaint the masked area with spatial consistency. The spatial attention layer 804 function may be described by the following equation, where MHSA is multi-head self-attention:

$$l_\theta(z_t) = MHSA(\text{Norm}(z_t))$$

The feed-forward network (FFN) 806 takes as input the output of the spatial attention layer 804 (e.g., a target frame). The FFN 806 determines how to outpaint the masked area of the input target frame by learning a weight. The FFN 806 function may be described by the following equation:

$$z'_t = l'_\theta(z_t) = W * l_\theta(z_t) + b$$

where the FFN 806 learns W and b. W is a matrix, not a scalar, because this is a deep learning approach.

The position layer 808 provides ordering information for each frame output from the FFN 806 before input to the temporal attention layer 810. That is, for a temporal sequence of frames such as F0, F1, F2, and so on, the position layer 808 provides information that F0 is the first frame, F1 follows F0, F2 follows F1, and so on. This position layer may be linear, or provided using a sine/cosine function.

The temporal attention layer 810 utilizes all of the frames 802 (e.g., outpainted condition frames as well as target frames that have been processed by the spatial attention layer 804 and FFN 806 with position information added by position layer 808) to outpaint masked areas of each target frame in the set (i.e., each frame in the set that has masked areas associated with it) while maintaining temporal consistency between the frames. The video dimension b f c h w is transformed into (h w) (b f) c for the input frames to the temporal attention layer 810. The frames are then input to an attention mechanism such as a multi-head attention mechanism.

For each pixel position, the temporal attention layer 810 studies the relationship of the corresponding pixels belonging to all of the input frames to determine how to outpaint the masked areas of the target frames. For example, for pixel position (0,0)—the top left corner pixel—the temporal attention layer 810 studies the pixel at position (0,0) of each frame and, if this position is in a masked area (i.e., the pixel is a masked pixel) in any frame, then the layer outpaints the pixel at that position in that frame based on the pixels at position (0,0) in all frames which contain a non-masked pixel at position (0,0). The function of temporal attention layer 810 may be described by the following equation:

$$z''_t = l_\phi(l'_\theta(z_t)) = MHSA(\text{Norm}(Pos(l'_\theta(z_t))))$$

Finally, the dimension of the output of the temporal attention layer 810 is transformed back to b f c h w.

The output of the FFN 806 is passed through a multiplier 812 and input to the spatial adaptor 816. The output of the temporal attention layer 810 is passed through a multiplier 814 and input to the temporal adaptor 818.

The spatial adaptor 816 and the temporal adaptor 818 then process the outputs of the spatial attention layer 804/FFN 806 and the temporal attention layer 810, respectively. The spatial adaptor 816 and the temporal adaptor 818 are both linear functions with learnable scalar parameter values in the range of 0 to 1. The parameter values of the adaptors are inversely proportionally related. In some embodiments, the parameters may sum to 1.

The parameter $s_\varnothing$ of the spatial adaptor 816 is a weight that represents how much the overall output is focused on spatial consistency (i.e., how much weight is given to spatial consistency from the spatial attention layer 804 and FFN 806), while the parameter $t_\varnothing$ of the temporal adaptor 818 is a weight that represents how much the overall output is focused on temporal consistency (i.e., how much weight is given to temporal consistency from the temporal attention layer 810). The spatial adaptor 816 learns how much weight it needs to apply from the output of the FFN 806 (and thus, from the spatial attention layer 804). The temporal adaptor 818 learns how much weight it needs to apply from the output of the temporal attention layer 810.

The spatial adaptor 816 applies its weight parameter (so) to the output of the FFN 806 ($z'_t$), and the output of the spatial adaptor 816 can thus be described by the following equation:

$$s_\phi * z'_t$$

Likewise, the temporal adaptor 818 applies its weight parameter (to) to the output of the temporal attention layer 810 ($z''_t$), and the output of the temporal adaptor 818 can thus be described by the following equation:

$$t_\phi * z''_t$$

The outputs of both adaptors are summed together and input to the FFN 820. Similar to FFN 806, this is a multi-order function that learns and applies a weight, and can be described by the following equation:

$$z_{t+1} = W * \phi(s_\phi * z'_t + t_\phi * z''_t) + b$$

where FFN 820 learns W and b. The output of the FFN 820 is an outpainted target frame at the desired second aspect ratio that has spatial consistency with its counterpart input target frame and temporal consistency with neighboring outpainted frames (whether target frames or condition frames).

Although FIG. 8 illustrates one example of an attention layer 800 for facilitating outpainting with spatio-temporal consistency, various changes may be made to FIG. 8. For example, various components and functions in FIG. 8 may be combined, further subdivided, replicated, or rearranged according to particular needs. Also, one or more additional components and functions may be included if needed or desired.

Figure 9:
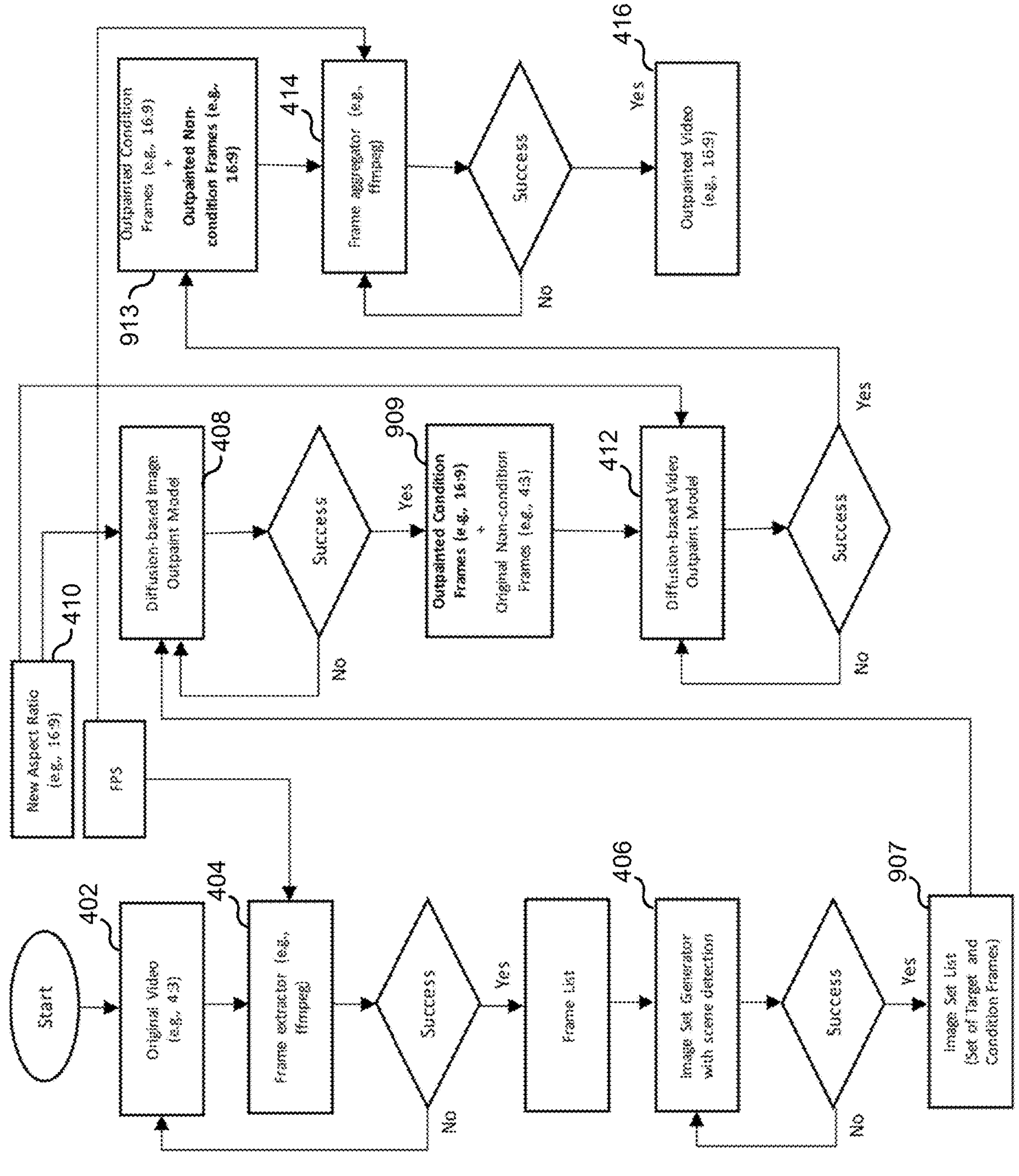
FIG. 9 illustrates an example process for video outpainting with spatio-temporal consistency in accordance with this disclosure.

FIG. 9 illustrates an example process 900 for video outpainting with spatio-temporal consistency in accordance with this disclosure. For ease of explanation, the process 900 shown in FIG. 9 is described as being implemented on or supported by the electronic device 101 in the network configuration 100 of FIG. 1. However, the process 900 shown in FIG. 9 could be used with any other suitable device(s) and in any other suitable system(s), such as when the process 900 is implemented on or supported by the server 106. Additionally, the process 900 is described as being performed by the system architecture 400 shown in FIG. 4 using the attention layer 800 as shown in FIG. 8 implemented in the U-Net 706 of the video outpainting model architecture 700 shown in FIG. 7. However, the process 900 shown in FIG. 9 could be performed using any suitable system architecture with an attention layer 800 that provides spatio-temporal consistency.

As shown in FIG. 9, the process 900 begins with the input of an original video (e.g., original video 402) having a first aspect ratio (e.g., 4:3), and the input of a new second aspect ratio (e.g., 16:9, desired second aspect ratio 410). A frame extractor (e.g., frame extractor 404) extracts the frames of the original video into a frame list (i.e., a set of images corresponding to the frames of the original video) based on the FPS of the original video.

An image set generator with scene detection (e.g., image set generator 406) is then used to group the frames of the frame list into image sets that correspond to scenes of the video. Condition frames for each scene are also identified, and in the resulting list 907 of image sets, each set includes target frames and one or more condition frames.

A diffusion-based image outpaint model (e.g., image outpaint model 408) is used to outpaint the condition frames for each image set to the second aspect ratio while maintaining spatial consistency with the corresponding original condition frames. In the resulting image set list 909, each image set includes outpainted condition frames and original target (non-condition) frames.

A diffusion-based video outpaint model (e.g., video outpaint model 412) is used to outpaint the original target frames for each image set to the second aspect ratio while maintaining spatial consistency with the corresponding original target frames and temporal consistency with other outpainted frames. In the resulting image set list 913, each image set includes outpainted condition frames and outpainted target frames (i.e., all of the frames are outpainted).

A frame aggregator (e.g., frame aggregator 414) assembles the frames of the image set list 913 into a final outpainted video (e.g., outpainted video 416) based on the FPS of the original video. The final outpainted video has the new second aspect ratio (e.g., 16:9) and the frames of the outpainted video have spatio-temporal consistency.

Although FIG. 9 illustrates one example of a process 900 for video outpainting with spatio-temporal consistency, various changes may be made to FIG. 9. For example, various components and functions in FIG. 9 may be combined, further subdivided, replicated, or rearranged according to particular needs. Also, one or more additional components and functions may be included if needed or desired.

The embodiments of the present disclosure discussed herein above outpaint target frames using condition frames that include both past frames and future frames (from the perspective of the target frames). This may be beneficial for maintaining temporal consistency of the target frames with past and future frames, however, future frames are not always available. For example, in a real-time operation such as video streaming, only past frames may be available for consideration in outpainting. Accordingly, some embodiments of the present disclosure are adapted to use only past frames for video outpainting.

Figure 10:
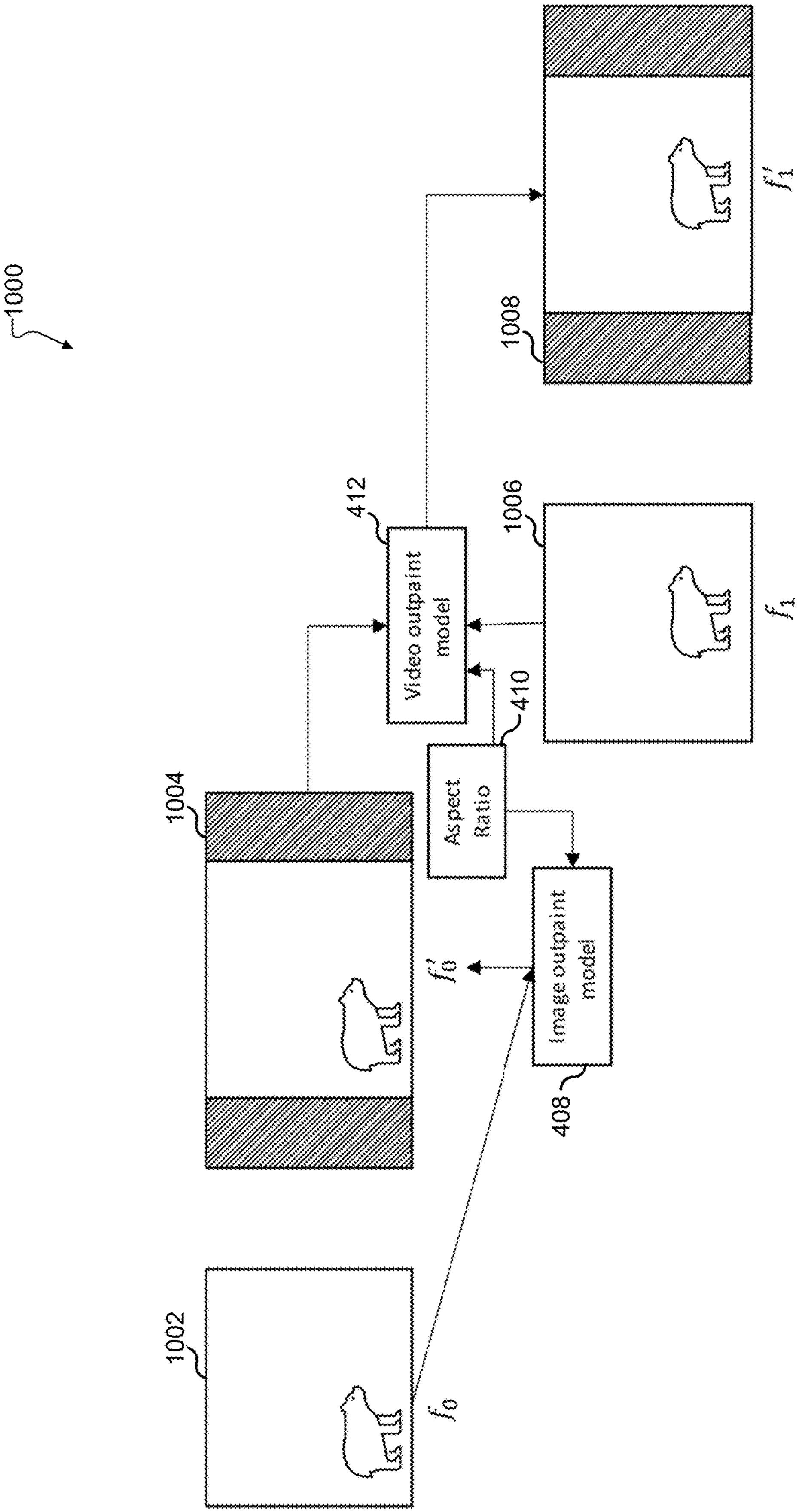
FIG. 10 illustrates an example of real-time functionality of a video outpaint model in accordance with this disclosure.

FIG. 10 illustrates an example 1000 of real-time functionality of a video outpaint model in accordance with this disclosure. The example 1000 may correspond to the functionality of the video outpaint model 412 of FIG. 4.

In the embodiment of FIG. 10, the video outpaint model will outpaint a frame based on a previous frame (e.g., the immediately preceding frame, or one or more other previous frames), then that outpainted frame (and any other previous outpainted frames) may be used as a condition frame to outpaint the next frame, and so on. As a result, future frames are not needed for outpainting in this embodiment. Additionally, image sets (e.g., image sets corresponding to scenes) are not used.

As shown in FIG. 10, an initial frame ($f_0$) of a real-time video stream is received. The initial frame $f_0$ has a first aspect ratio and is used as an original condition frame 1002. The original condition frame 1002 is input to an image outpaint model (e.g., image outpaint model 408 of FIG. 4). The image outpaint model 408 generates an outpainted initial frame 1004

$$(f_0')$$

that has a second aspect ratio (e.g., the desired second aspect ratio 410) while maintaining spatial consistency with the original condition frame 1002.

After the initial frame is received, a second frame ($f_1$) of the real-time video stream is received, where $f_1$ has the first aspect ratio. The second frame $f_1$ is then an original target frame 1006 that needs outpainting. After the initial frame $f_0$ has been outpainted as $$f_0'$$

(outpainted frame 1004), $$f_0'$$

and $f_1$ (original target frame 1006) are input to a video outpaint model (e.g., the video outpaint model 412). The video outpaint model 412 uses the outpainted frame 1004

$$(f_0')$$

to generate a second outpainted frame 1008

$$(f_1')$$

that has the second aspect ratio while maintaining spatial consistency with the original target frame 1006 and temporal consistency with the previously outpainted frame 1004.

The outpainted frame 1008 may then be used by the video outpaint model 412 as a condition frame for outpainting the subsequently received frame of the real-time video stream (e.g., $f_1$, not illustrated). Going forward, each outpainted frame may be used in this manner to outpaint the subsequently received frame in the real-time video stream while maintaining spatial consistency with the original frame and temporal consistency with the previously outpainted frame. In some embodiments, more than one previously outpainted frame may be used for outpainting subsequently received frames, and temporal consistency is maintained with all such previously outpainted frames.

Although FIG. 10 illustrates one example of real-time functionality of a video outpaint model, various changes may be made to FIG. 10. For example, various components and functions in FIG. 10 may be combined, further subdivided, replicated, or rearranged according to particular needs. Also, one or more additional components and functions may be included if needed or desired.

Figure 11:
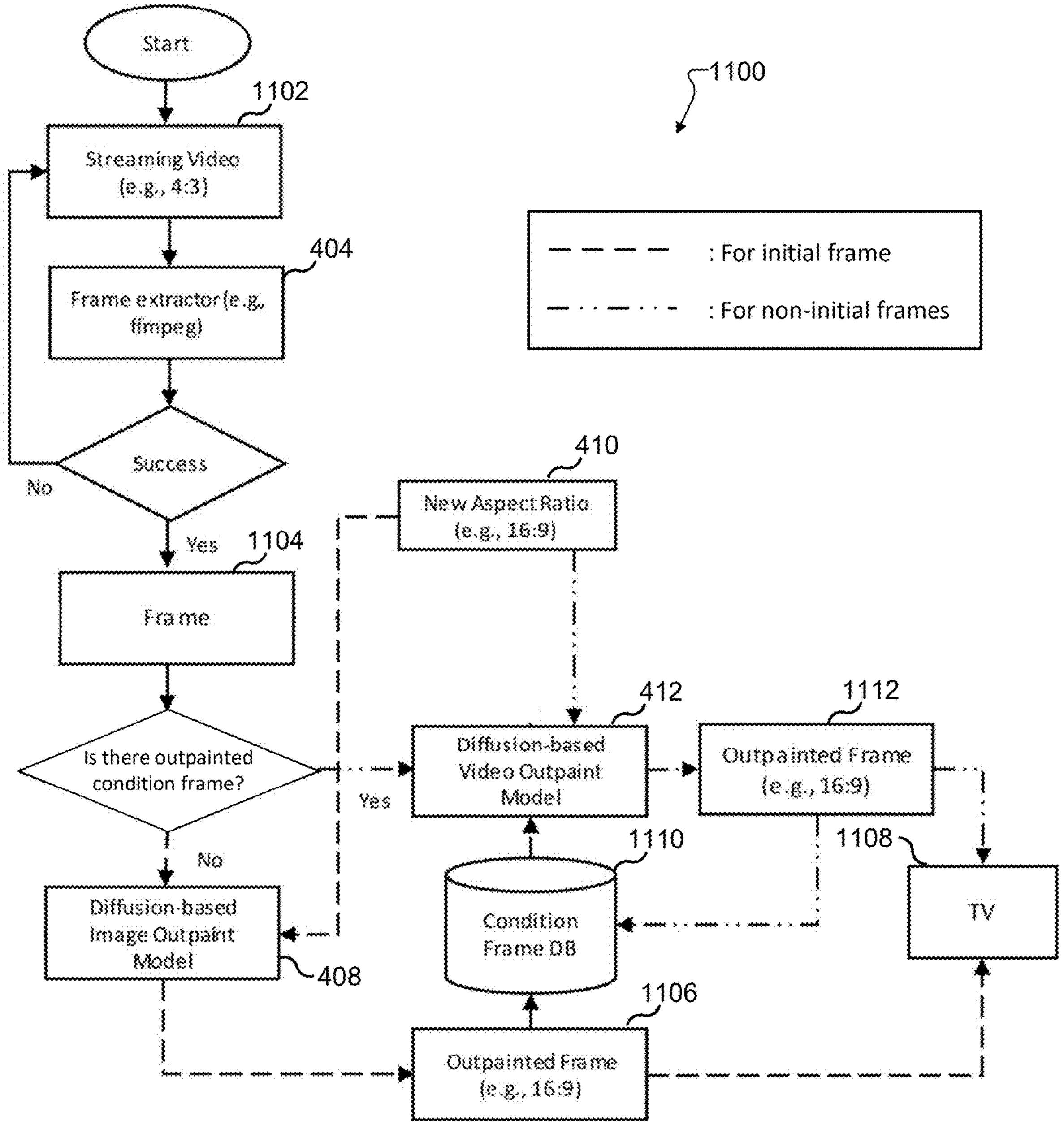
FIG. 11 illustrates an example process for real-time video outpainting with spatio-temporal consistency in accordance with this disclosure.

FIG. 11 illustrates an example process 1100 for real-time video outpainting with spatio-temporal consistency in accordance with this disclosure. For ease of explanation, the process 1100 shown in FIG. 11 is described as being implemented on or supported by the electronic device 101 in the network configuration 100 of FIG. 1. However, the process 1100 shown in FIG. 11 could be used with any other suitable device(s) and in any other suitable system(s), such as when the process 1100 is implemented on or supported by the server 106. Additionally, the process 1100 is described as being performed by the system architecture 400 shown in FIG. 4 using the attention layer 800 as shown in FIG. 8 implemented in the U-Net 706 of the video outpainting model architecture 700 shown in FIG. 7. However, the process 1100 shown in FIG. 11 could be performed using any suitable system architecture with an attention layer 800 that provides spatio-temporal consistency.

As shown in FIG. 11, the process 1100 begins with the input of a real-time video stream 1102 having a first aspect ratio (e.g., 4:3), and the input of a new second aspect ratio (e.g., 16:9, desired second aspect ratio 410). A frame extractor (e.g., frame extractor 404) extracts frames of the video stream 1102 in real-time (as an original frame 1104).

When the original frame 1104 is determined to be the first frame of the real-time video stream 1102 (e.g., initial frame $f_0$), the original frame 1104 is passed to a diffusion-based image outpaint model (e.g., image outpaint model 408 of FIG. 4). The diffusion-based image outpaint model generates an outpainted frame 1106 (e.g., outpainted initial frame $$f_0')$$

having the second aspect ratio 410 (e.g., 16:9) while maintaining spatial consistency with the corresponding original frame 1104 ($f_0$).

The outpainted frame 1106

$$(f_0')$$

is then output to a display 1108 (in this example, a TV) in real-time. Additionally, the outpainted frame 1106 is stored in a database (DB), such as condition frame DB 1110, for later use by the video outpaint model as a condition frame.

For subsequently received frames of the real-time video stream 1102—i.e., frames that are determined not to be the initial frame—a diffusion-based video outpaint model (e.g., the video outpaint model 412) is employed for outpainting. Each subsequently received original frame 1104 (e.g., second frame $f_1$) is accordingly passed to the diffusion-based video outpaint model, which looks up one or more previously outpainted frames in the condition frame DB 1110 and uses them as condition frames to generate an outpainted frame 1112 (e.g., second outpainted frame $$f_1')$$

having the second aspect ratio 410 (e.g., 16:9) while maintaining spatial consistency with the corresponding original frame 1104 ($f_1$) and temporal consistency with the one or more previously outpainted frames.

The outpainted frame 1112

$$(f_1')$$

is then output to the display 1108 in real-time, and is also stored in the condition frame DB 1110 for later use by the video outpaint model as another condition frame. In this way, a user can watch a video in the second aspect ratio that is streamed in real time from a source having the first aspect ratio.

For the example of the second frame $f_1$, only the outpainted initial frame $$f_0'$$

is present in the DB, and accordingly the diffusion-based video outpaint model generates the second outpainted frame $$f_1'$$

using only $$f_0'$$

as the condition frame. The second outpainted frame $$f_1'$$

thus has spatial consistency with the original second frame $f_1$ and temporal consistency with $$f_0'.$$

For subsequently received frames, such as a third frame $f_2$, the immediately previously received outpainted frame $$(f_1'$$

in this case) may be used as a condition frame for the diffusion-based video outpaint model. In other embodiments, however, any number of other outpainted frames in the condition frame DB 1110 may also be used as condition frames. This may increase the processing power required to outpaint the stream, while improving the temporal consistency of the resulting outpainted real-time video stream.

Although FIG. 11 illustrates one example of a process 1100 for real-time video outpainting with spatio-temporal consistency, various changes may be made to FIG. 11. For example, various components and functions in FIG. 11 may be combined, further subdivided, replicated, or rearranged according to particular needs. Also, one or more additional components and functions may be included if needed or desired.

As discussed herein above, various embodiments of the present disclosure includes a scene detection algorithm (e.g., scene detection algorithm 504 of FIG. 5) that may be used to group frames of a video into sets of images related to the same scene of the movie. In such embodiments, a scene summary—that is, a text summary of the contents of a scene—may be beneficially used by a video outpainting model to more accurately determine how to outpaint a masked area of the frames in the image set.

Figure 12:
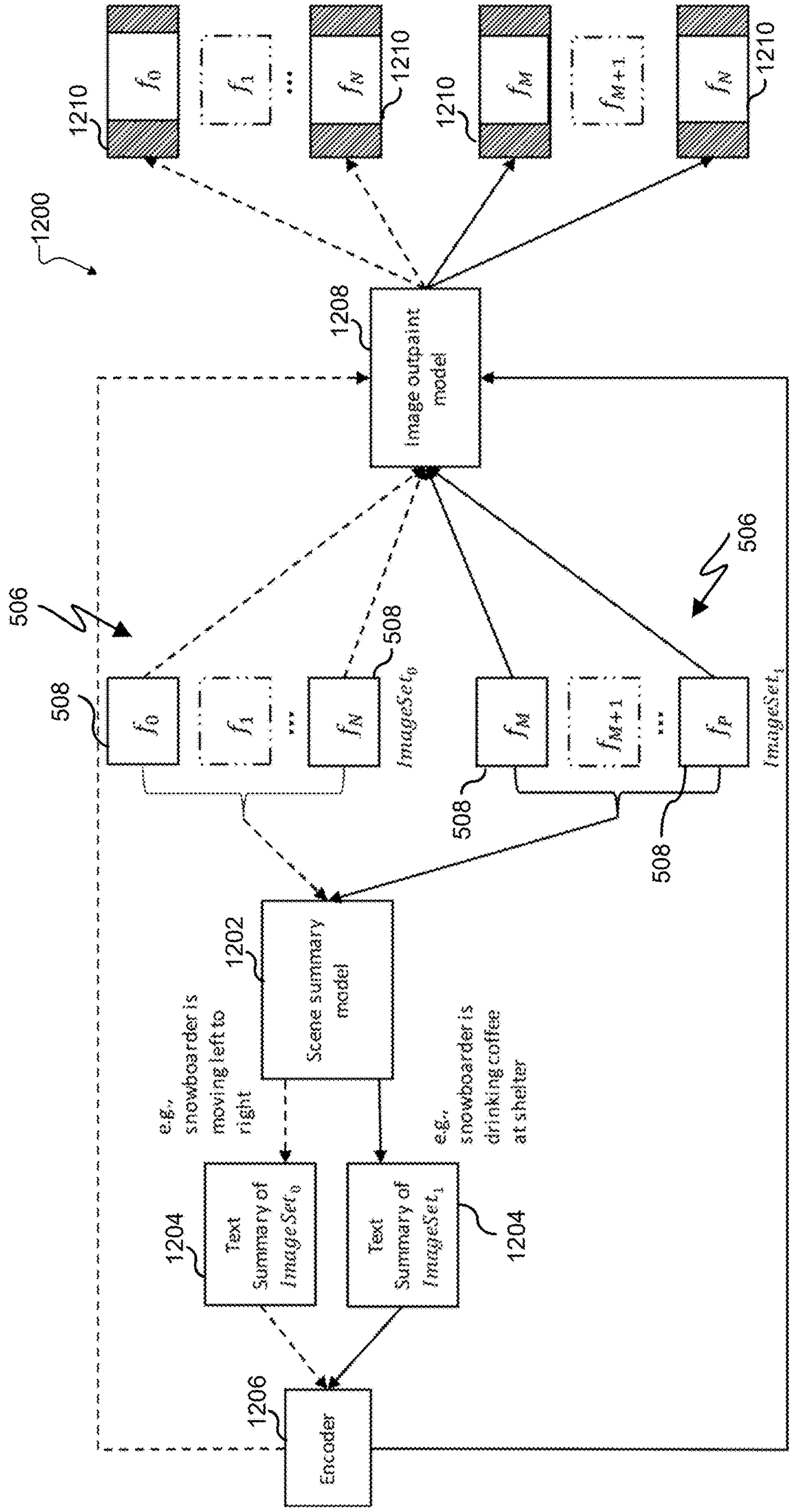
FIG. 12 illustrates an example process for image set generation with scene detection, scene summary, and condition frame outpainting in accordance with this disclosure.

FIG. 12 illustrates an example process 1200 for image set generation with scene detection, scene summary, and condition frame outpainting in accordance with this disclosure. In the example of FIG. 12, image set generation and scene detection have already been performed (e.g., using the image set generator 406 of FIG. 4 with the scene detection algorithm 504 of FIG. 5, not illustrated) and the frames of the original video have been grouped into image sets 506 with respective condition frames 508.

As illustrated in FIG. 12, the image sets 506 are additionally passed through a scene summary model 1202 (e.g., CLIP). The scene summary model 1202 analyzes the image sets and generates a textual scene summary 1204 for each respective image set 506. In this example, the scene summary 1204 for ImageSet0 is "snowboarder is moving left to right" and the scene summary 1204 for ImageSet1 is "snowboarder is drinking coffee at shelter".

The scene summaries 1204 are then passed through an encoder model 1206 (e.g., word2vec) to produce a representation (e.g., a distributed representation) of the scene summaries that can be utilized by the image outpaint model 1208 (which may be an image outpaint model 408 modified to additionally utilize scene summary information). The encoded scene summaries are in turn passed from the encoder model 1206 to the image outpaint model 1208, which utilizes the encoded scene summaries to more accurately generate outpainted condition frames 1210 from condition frames 508 (as compared to, e.g., outpainted condition frames 510 of FIG. 5 that are outpainted without considering a scene summary). Alternatively, the encoded scene summaries may be stored with the corresponding image set 506, such that when the image set 506 is input to the image outpaint model 408 the corresponding encoded scene summary is also available to the image outpaint model 408.

Although FIG. 12 illustrates one example of a process 1200 for image set generation with scene detection, scene summary, and condition frame outpainting, various changes may be made to FIG. 12. For example, various components and functions in FIG. 12 may be combined, further subdivided, replicated, or rearranged according to particular needs. Also, one or more additional components and functions may be included if needed or desired.

Figure 13A:
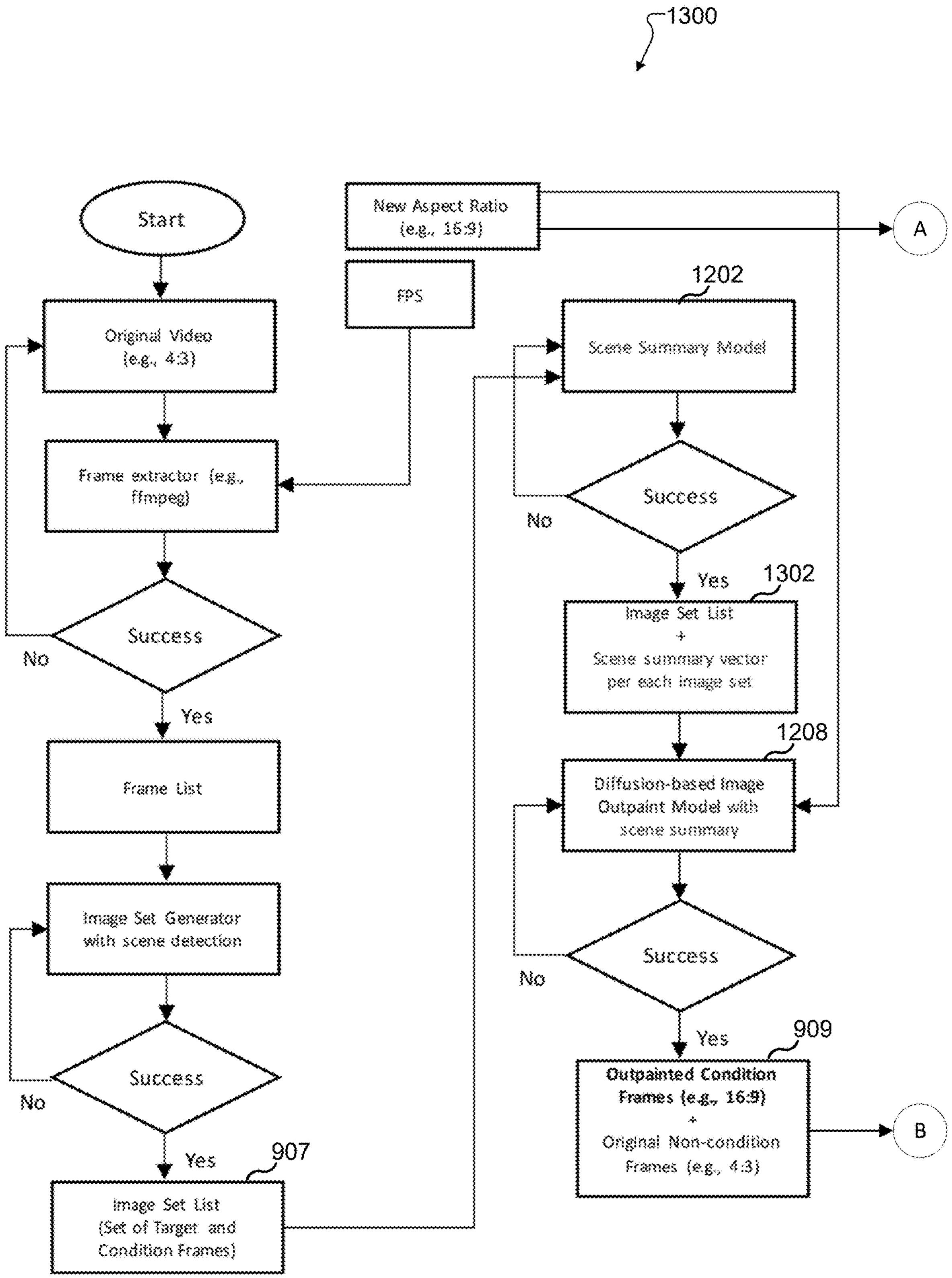
FIGS. 13A and 13B illustrate an example process for video outpainting with spatio-temporal consistency using scene summaries with the image outpaint model in accordance with this disclosure.
Figure 13B:
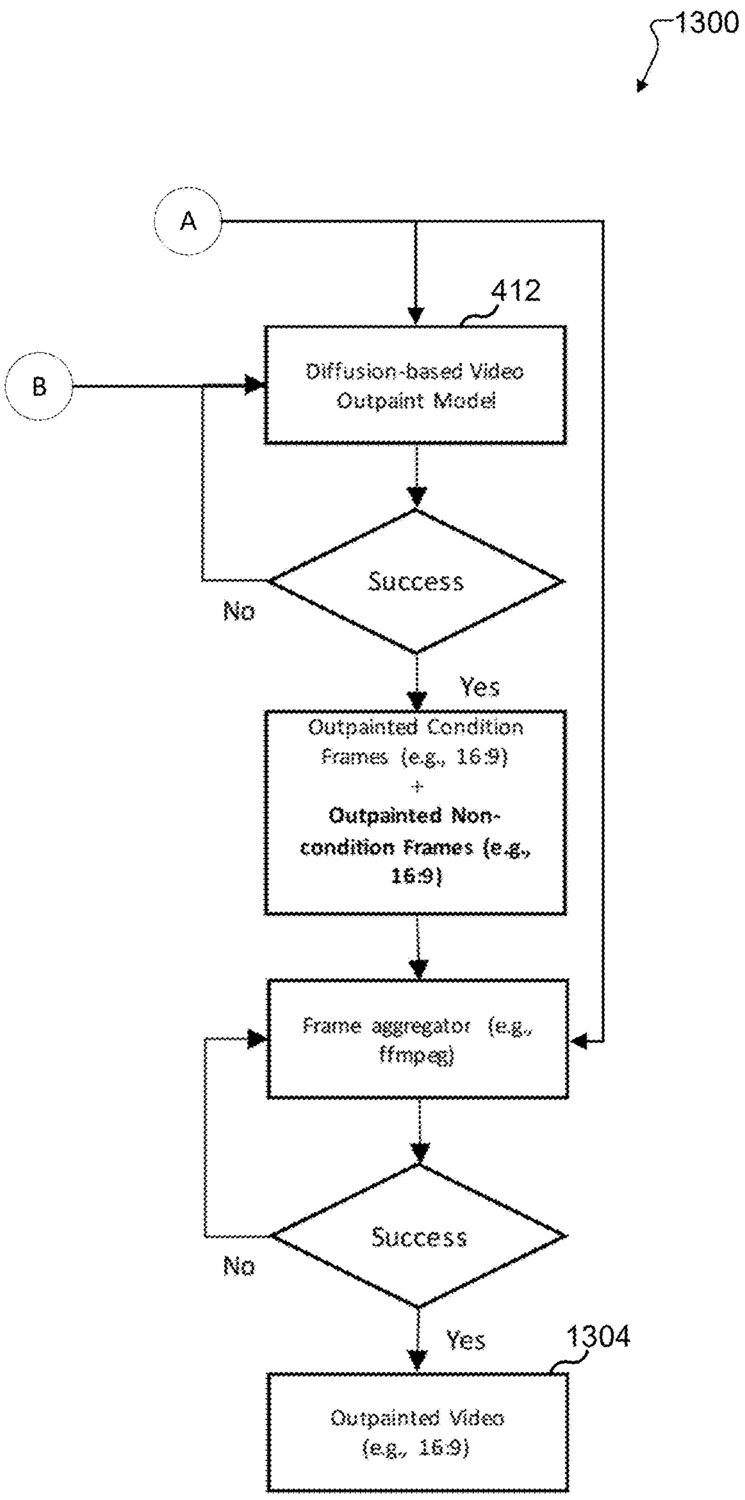

FIGS. 13A and 13B illustrate an example process 1300 for video outpainting with spatio-temporal consistency using scene summaries with the image outpaint model in accordance with this disclosure. For ease of explanation, the process 1300 shown in FIGS. 13A and 13B is described as a modification of the process 900 shown in FIG. 9, implemented on or supported by the electronic device 101 in the network configuration 100 of FIG. 1. Description of unchanged functions will be omitted for the sake of avoiding repetition.

As shown in FIG. 13A, the process 1300 follows the process 900 up to generation of the list 907 of image sets, in which each set includes target frames and one or more condition frames. A scene summary model (e.g., scene summary model 1202 of FIG. 12) is used to generate a scene summary for each image set in the list 907. An encoder (e.g., encoder 1206 of FIG. 12, not illustrated) may be used to convert the scene summaries into encoded scene summaries. The resulting image set list 1302 is the image set list 907 with corresponding scene summary information added to each image set in the list.

A diffusion-based image outpaint model (e.g., image outpaint model 1208) is used to outpaint the condition frames for each image set in list 1302 to the second aspect ratio while maintaining spatial consistency with the corresponding original condition frames, utilizing the corresponding scene summary information for each image set to further enhance the spatial consistency. In the resulting image set list 909, each image set includes outpainted condition frames and original target (non-condition) frames.

As shown in FIG. 13B, the process 1300 follows the process 900 once the image set list 909 has been generated. The final outpainted video 1304 has the new second aspect ratio and the frames of the outpainted video have spatio-temporal consistency similar to the final outpainted video 416 of process 900, however, the use of scene summary information in the image outpaint model will improve the spatio-temporal consistency of video 1304 even further as compared to the final outpainted video 416 of process 900.

Although FIGS. 13A and 13B illustrate one example of a process 1300 for video outpainting with spatio-temporal consistency using scene summaries with the image outpaint model, various changes may be made to FIGS. 13A and 13B. For example, various components and functions in FIGS. 13A and 13B may be combined, further subdivided, replicated, or rearranged according to particular needs. Also, one or more additional components and functions may be included if needed or desired.

In some embodiments, the encoded scene summaries generated in process 1200 of FIG. 12 may also be utilized by the video outpaint models discussed herein above (e.g., the video outpaint model 412 of FIG. 4). This may allow the video outpaint model to reap similar benefits to those discussed in process 1200 with respect to the image outpaint model 408—that is, improvement in the spatio-temporal consistency of outpainted target frames resulting from outpainting that utilizes the scene summary information.

Figure 14A:
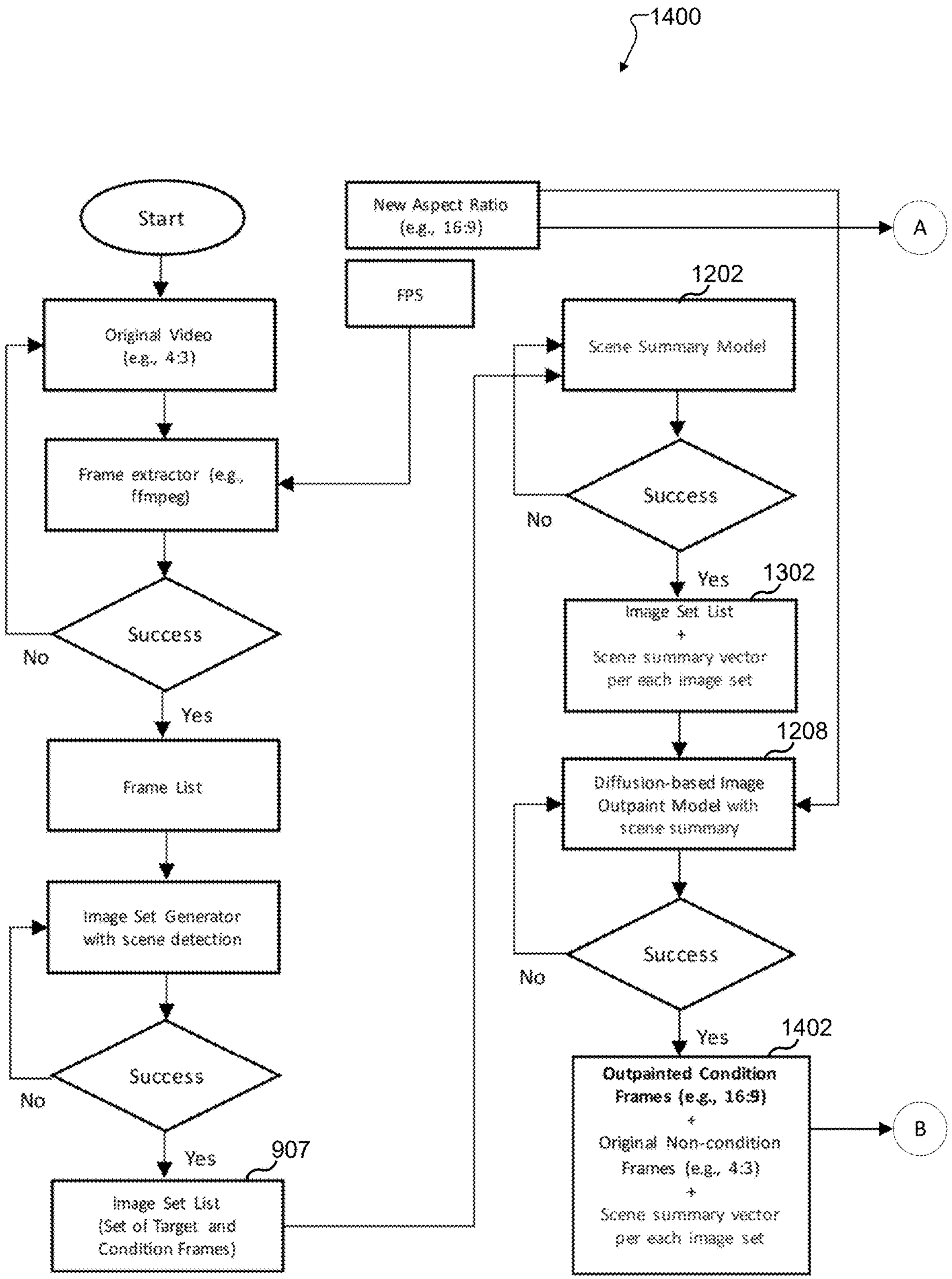
FIGS. 14A and 14B illustrate an example process for video outpainting with spatio-temporal consistency using scene summaries with the video outpaint model in accordance with this disclosure.
Figure 14B:
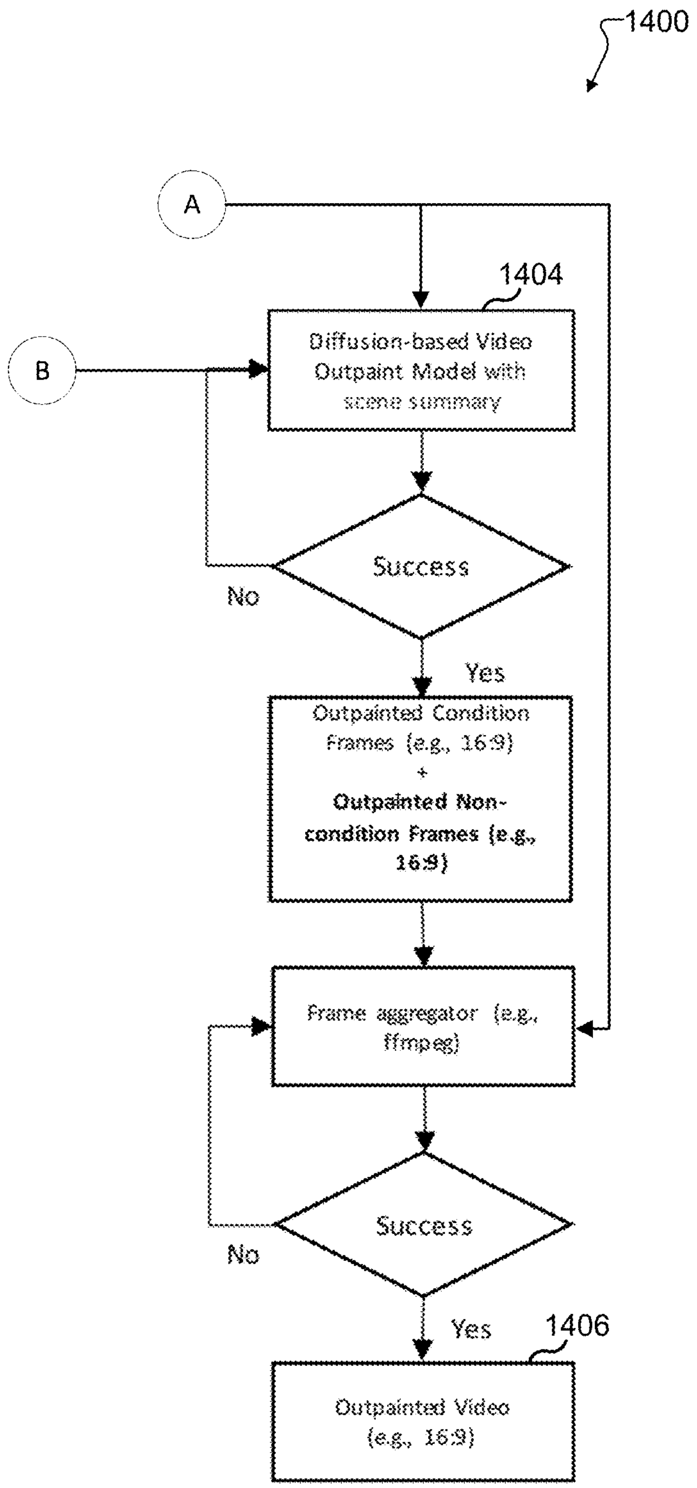

FIGS. 14A and 14B illustrate an example process 1400 for video outpainting with spatio-temporal consistency using scene summaries with the video outpaint model in accordance with this disclosure. For ease of explanation, the process 1400 shown in FIGS. 14A and 14B is described as a modification of the process 1300 shown in FIGS. 13A and 13B, implemented on or supported by the electronic device 101 in the network configuration 100 of FIG. 1. Description of unchanged functions will be omitted for the sake of avoiding repetition.

As shown in FIG. 14A, the process 1400 follows the process 1300 up to the processing by the diffusion-based image outpaint model (e.g., image outpaint model 1208) to outpaint the condition frames for each image set in list 1302 utilizing the corresponding scene summary information for each image set. In the resulting image set list 1402, each image set includes outpainted condition frames and original target (non-condition) frames, and the scene summary information corresponding to each image set in the list.

As shown in FIG. 13B, a diffusion-based video outpaint model (e.g., video outpaint model 1404) is used to outpaint the original target frames for each image set to the second aspect ratio while maintaining spatial consistency with the corresponding original target frames and temporal consistency with other outpainted frames, utilizing the corresponding scene summary information for each image set to further enhance the spatial and temporal consistency. The final outpainted video 1406 has the new second aspect ratio and the frames of the outpainted video have spatio-temporal consistency similar to the final outpainted video 1304 of process 1300, however, the use of scene summary information in the video outpaint model will improve the spatio-temporal consistency of video 1406 even further as compared to the final outpainted video 1304 of process 1300.

Although FIGS. 14A and 14B illustrate one example of a process 1400 for video outpainting with spatio-temporal consistency using scene summaries with the video outpaint model, various changes may be made to FIGS. 14A and 14B. For example, various components and functions in FIGS. 14A and 14B may be combined, further subdivided, replicated, or rearranged according to particular needs. Also, one or more additional components and functions may be included if needed or desired.

Figure 15:
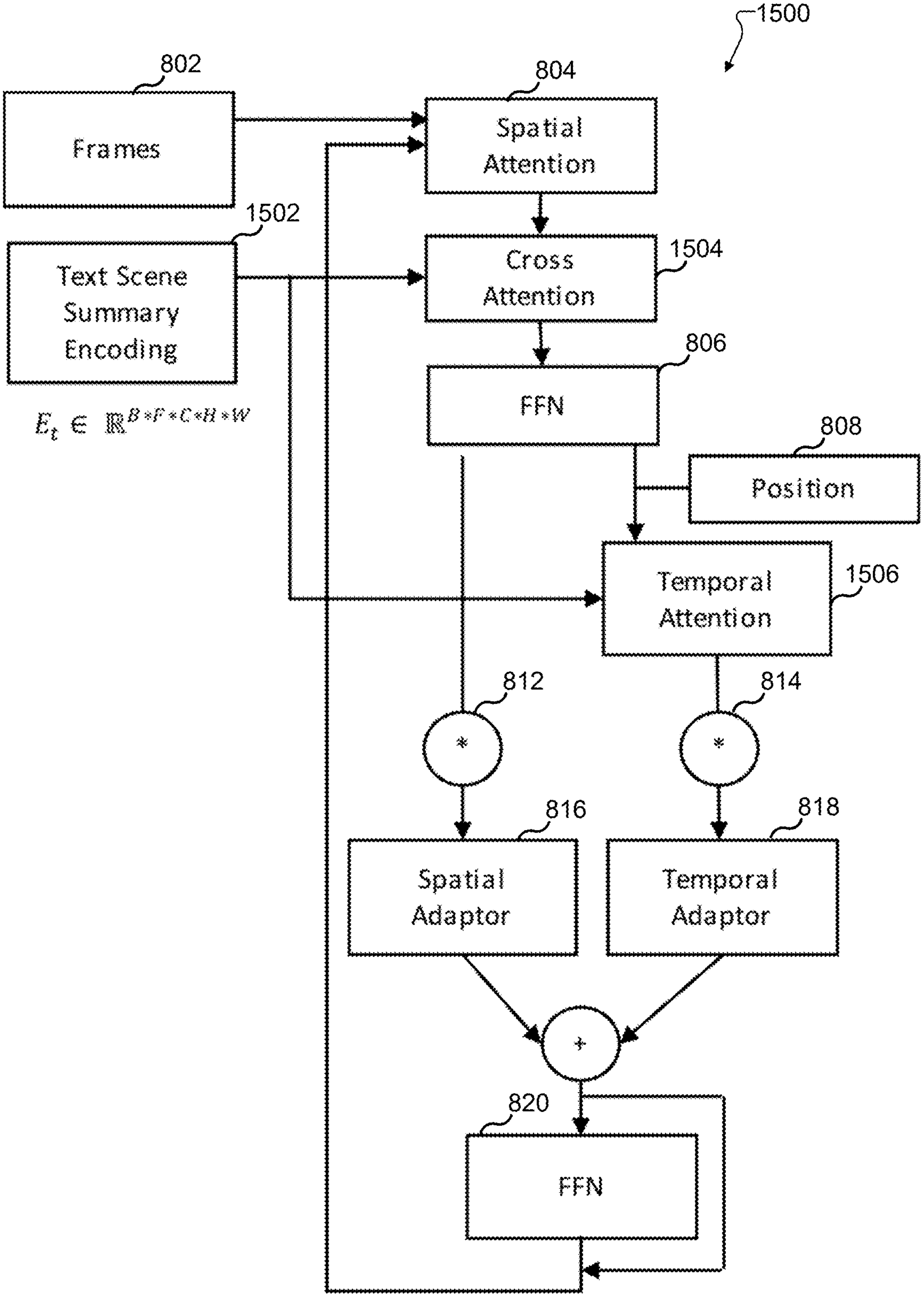
FIG. 15 illustrates an example implementation of an attention layer for facilitating outpainting with spatio-temporal consistency using scene summaries in accordance with this disclosure.

FIG. 15 illustrates an example implementation of an attention layer 1500 for facilitating outpainting with spatio-temporal consistency using scene summaries in accordance with this disclosure. The attention layer 1500 may be used, for example, in the image outpaint model 1208 of FIGS. 12, 13A, and 14A, and in the video outpaint model 1404 of FIG. 14B. For ease of explanation, the attention layer 1500 shown in FIG. 15 is described as a modification of the attention layer 800 shown in FIG. 8, which may correspond to an attention layer 710 of the U-Net 706 of FIG. 7, implemented on or supported by the electronic device 101 in the network configuration 100 of FIG. 1. Description of unchanged functions will be omitted for the sake of avoiding repetition.

As shown in FIG. 15, the attention layer 1500 includes a cross attention layer 1504 and a temporal attention layer 1506 that is modified from temporal attention layer 810 of FIG. 8. The attention layer 1500 operates on an input set of frames 802 and an input text-based scene summary encoding 1502 (e.g., produced by the scene summary model 1202 of FIGS. 12, 13A, and 14A). The 1502 is designated as $E_t \in \mathbb{R}^{B*F*C*H*W}$ where B is batch size, F is number of images in the set, C is number of channels, H is height, and W is width (as in FIG. 8).

The cross attention layer 1504 operates on the output of the spatial attention layer 804 and the text-based scene summary encoding 1502. The cross attention layer 1504 learns the relationship between target frames and the scene summary encoding together, and its function may be described by the following equation:

$$l'_\theta(z_t) = l_\theta(z_t) + MHSA(\text{Norm}(E_t))$$

The FFN 806 operates as in FIG. 8, but takes as input the output of the cross attention layer 1504, and thus its output is now described by the following equation:

$$z'_t = l''_\theta(z_t) = W * l'_\theta(z_t) + b$$

The temporal attention layer 1506 functions similarly to temporal attention layer 810 of FIG. 8, but takes as an additional input the text-based scene summary encoding 1502. The temporal attention layer 1506 learns the relationship between the target frames, condition frames, and the scene summary encoding together. The function of the temporal attention layer 1506 may be described by the following equation:

$$z''_t = l_\Phi(l''_\theta(z_t)) = MHSA(\text{Norm}(Pos(l''_\theta(z_t))))$$

The remaining portions of the attention layer 1500 function as in the attention layer 800 of FIG. 8, based on the outputs of the cross attention layer 1504 and the temporal attention layer 1506.

Although FIG. 15 illustrates one example of an attention layer 1500 for facilitating outpainting with spatio-temporal consistency using scene summaries, various changes may be made to FIG. 15. For example, various components and functions in FIG. 15 may be combined, further subdivided, replicated, or rearranged according to particular needs. Also, one or more additional components and functions may be included if needed or desired.

Figure 16:
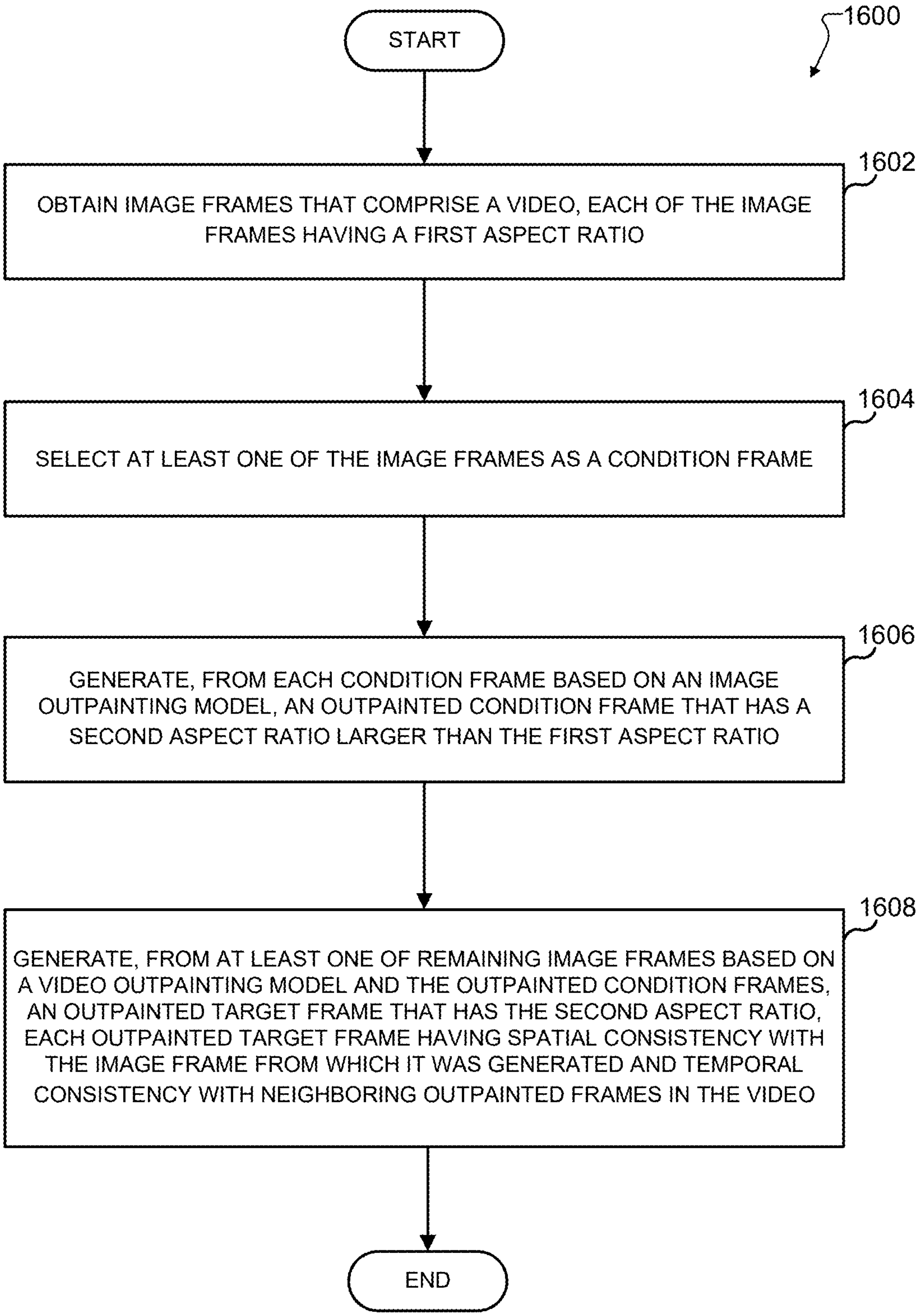
FIG. 16 illustrates an example method for facilitating generative AI-based video outpainting with temporal awareness in accordance with this disclosure.

FIG. 16 illustrates an example method 1600 for facilitating generative AI-based video outpainting with temporal awareness in accordance with this disclosure. For ease of explanation, the method 1600 shown in FIG. 16 is described as being performed using the electronic device 101 in the network configuration 100 of FIG. 1. However, the method 1600 could be performed using any other suitable device(s), such as the server 106, and in any other suitable system(s). As a particular example, the method 1600 can be executed on the server 106 in the network configuration 100 of FIG. 1, and outpainted videos can be provided to a client electronic device 101 for display. However, the method 1600 may be used with any other suitable device(s), such as the electronic device 101, and in any other suitable system(s).

At block 1602, the processor obtains image frames that comprise a video, each of the image frames having a first aspect ratio. Each image frame having the first aspect ratio is comprised of a certain number of pixels. The image frames may be in temporal order, or have temporal ordering information associated with them. In some embodiments, the processor then groups the image frames having the first aspect ratio into image sets that each correspond to a scene of the video. In some embodiments, the image frames are obtained in real time (e.g., the image frames comprise a streaming video).

At block 1604, the processor selects at least one of the image frames as a condition frame. The selected condition frame(s) may be representative of the objects contained in the video. If the image frames are received in real time at block 1602, then the processor selects an earliest of the obtained image frames as the condition frame.

If the image frames have been grouped into image sets that each correspond to a scene of the video, then at block 1604 the processor selects the at least one of the image frames from one of the image sets as the condition frame, wherein the condition frame corresponds to the image set. In this case, the selected condition frame(s) may be representative of the objects contained in the scene of the video.

At block 1606, the processor generates, from each condition frame based on an image outpainting model, an outpainted condition frame that has a second aspect ratio different from (e.g., larger than) the first aspect ratio. That is, the outpainted condition frame is comprised of more pixels than the original condition frame having the first aspect ratio.

If the image frames have been grouped into image sets that each correspond to a scene of the video, then at block 1606 the processor generates, from each condition frame that corresponds to the image set based on the image outpainting model, the outpainted condition frame that has the second aspect ratio, wherein the outpainted condition frame corresponds to the image set. In some embodiments, the processor additionally generates, for each image set, a text summary of the corresponding scene of the video, and then generates the outpainted condition frame from each condition frame that corresponds to the image set based on the image outpainting model and the text summary.

At block 1608, the processor generates, from at least one of remaining image frames based on a video outpainting model and the outpainted condition frames, an outpainted target frame that has the second aspect ratio, each outpainted target frame having spatial consistency with the image frame from which it was generated and temporal consistency with neighboring outpainted frames in the video. In some embodiments, the outpainted target frame is generated based on the video outpainting model, the outpainted condition frames, and relative temporal locations of the outpainted condition frames and the at least one remaining image frame.

If the image frames are obtained in real time at block 1602, then at block 1608 the processor generates the outpainted target frame from a neighboring subsequently obtained image frame based on the video outpainting model and the outpainted condition frame, and then generates, from each other subsequently obtained image frame based on the video outpainting model and the outpainted target frame, a subsequent outpainted target frame having the second aspect ratio, spatial consistency with the image frame from which it was generated, and temporal consistency with the neighboring outpainted target frame.

If the image frames have been grouped into image sets that each correspond to a scene of the video, then at block 1608 the processor generates, from at least one of the remaining image frames from the image set based on the video outpainting model and the outpainted condition frames corresponding to the image set, the outpainted target frames, each outpainted target frame corresponding to the image set and having spatial consistency with the image frame from which it was generated and temporal consistency with neighboring outpainted frames in the scene corresponding to the image set. In embodiments in which the processor generated text summaries of the scenes of the video, the processor generates the outpainted target frames corresponding to the image set based on the video outpainting model, the outpainted condition frames corresponding to the image set, and the text summary.

The processor may, after generating at least one of the outpainted target frames, generate another outpainted target frame from at least one of the other remaining image frames based on the video outpainting model, the outpainted condition frames, and the outpainted target frames, the other outpainted target frame having the second aspect ratio, spatial consistency with the image frame from which it was generated, and temporal consistency with neighboring outpainted frames in the video.

Although FIG. 16 illustrates one example of a method 1600 for facilitating generative AI-based video outpainting with temporal awareness, various changes may be made to FIG. 16. For example, while shown as a series of steps, various steps in FIG. 16 could overlap, occur in parallel, occur in a different order, or occur any number of times (including zero times).

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method performed by an electronic device, the method comprising:

obtaining, by a processor of the electronic device, image frames that comprise a video, each of the image frames having a first aspect ratio;

selecting, by the processor of the electronic device, at least one of the image frames as a condition frame;

generating, by the processor of the electronic device, from each condition frame based on an image outpainting model, an outpainted condition frame that has a second aspect ratio different from the first aspect ratio; and generating, by the processor of the electronic device, from at least one of remaining image frames based on a video outpainting model and the outpainted condition frames, an outpainted target frame that has the second aspect ratio, each outpainted target frame having spatial consistency with the image frame from which it was generated and temporal consistency with neighboring outpainted frames in the video.

2. The method of claim 1, further comprising:

grouping, by the processor of the electronic device, the image frames having the first aspect ratio into image sets that each correspond to a scene of the video;

selecting, by the processor of the electronic device, the at least one of the image frames from one of the image sets as the condition frame, wherein the condition frame corresponds to the image set;

generating, by the processor of the electronic device, from each condition frame that corresponds to the image set based on the image outpainting model, the outpainted condition frame that has the second aspect ratio, wherein the outpainted condition frame corresponds to the image set; and generating, by the processor of the electronic device, from at least one of the remaining image frames from the image set based on the video outpainting model and the outpainted condition frames corresponding to the image set, the outpainted target frames, each outpainted target frame corresponding to the image set and having spatial consistency with the image frame from which it was generated and temporal consistency with neighboring outpainted frames in the scene corresponding to the image set.

3. The method of claim 2, further comprising:

generating, by the processor of the electronic device, for each image set, a text summary of the corresponding scene of the video; and generating, by the processor of the electronic device, from each condition frame that corresponds to the image set based on the image outpainting model and the text summary, the outpainted condition frame.

4. The method of claim 3, further comprising:

generating, by the processor of the electronic device, the outpainted target frames corresponding to the image set from the at least one of the remaining image frames from the image set based on the video outpainting model, the outpainted condition frames corresponding to the image set, and the text summary.

5. The method of claim 1, wherein:
the image frames are in temporal order, and
the method comprises generating, by the processor of the electronic device, from the at least one remaining image frame based on the video outpainting model, the outpainted condition frames, and relative temporal locations of the outpainted condition frames and the at least one remaining image frame, the outpainted target frame.

6. The method of claim 1, further comprising:
after generating at least one of the outpainted target frames, generating, by the processor of the electronic device, another outpainted target frame from at least one of the other remaining image frames based on the video outpainting model, the outpainted condition frames, and the outpainted target frames, the other outpainted target frame having the second aspect ratio, spatial consistency with the image frame from which it was generated, and temporal consistency with neighboring outpainted frames in the video.

7. The method of claim 1, further comprising:
obtaining, by the processor of the electronic device, the image frames having the first aspect ratio in real time;
selecting, by the processor of the electronic device, an earliest of the obtained image frames as the condition frame;
generating, by the processor of the electronic device, from a neighboring subsequently obtained image frame based on the video outpainting model and the outpainted condition frame, the outpainted target frame having the second aspect ratio, spatial consistency with the image frame from which it was generated, and temporal consistency with the outpainted condition frame; and
generating, by the processor of the electronic device, from each other subsequently obtained image frame based on the video outpainting model and the outpainted target frame, a subsequent outpainted target frame having the second aspect ratio, spatial consistency with the image frame from which it was generated, and temporal consistency with the neighboring outpainted target frame.

8. An electronic device comprising:
a processor configured to:
obtain image frames that comprise a video, each of the image frames having a first aspect ratio;
select at least one of the image frames as a condition frame;
generate, from each condition frame based on an image outpainting model, an outpainted condition frame that has a second aspect ratio different from the first aspect ratio; and
generate, from at least one of remaining image frames based on a video outpainting model and the outpainted condition frames, an outpainted target frame that has the second aspect ratio, each outpainted target frame having spatial consistency with the image frame from which it was generated and temporal consistency with neighboring outpainted frames in the video.

9. The electronic device of claim 8, wherein the processor is further configured to:
group the image frames having the first aspect ratio into image sets that each correspond to a scene of the video;
select the at least one of the image frames from one of the image sets as the condition frame, wherein the condition frame corresponds to the image set;
generate, from each condition frame that corresponds to the image set based on the image outpainting model, the outpainted condition frame that has the second aspect ratio, wherein the outpainted condition frame corresponds to the image set; and
generate, from at least one of the remaining image frames from the image set based on the video outpainting model and the outpainted condition frames corresponding to the image set, the outpainted target frames, each outpainted target frame corresponding to the image set and having spatial consistency with the image frame from which it was generated and temporal consistency with neighboring outpainted frames in the scene corresponding to the image set.

10. The electronic device of claim 9, wherein the processor is further configured to:
generate, for each image set, a text summary of the corresponding scene of the video; and
generate, from each condition frame that corresponds to the image set based on the image outpainting model and the text summary, the outpainted condition frame.

11. The electronic device of claim 10, wherein the processor is further configured to:
generate the outpainted target frames corresponding to the image set from the at least one of the remaining image frames from the image set based on the video outpainting model, the outpainted condition frames corresponding to the image set, and the text summary.

12. The electronic device of claim 8, wherein:
the image frames are in temporal order, and
the processor is further configured to generate, from the at least one remaining image frame based on the video outpainting model, the outpainted condition frames, and relative temporal locations of the outpainted condition frames and the at least one remaining image frame, the outpainted target frame.

13. The electronic device of claim 8, wherein the processor is further configured to:
after generating at least one of the outpainted target frames, generate another outpainted target frame from at least one of the other remaining image frames based on the video outpainting model, the outpainted condition frames, and the outpainted target frames, the other outpainted target frame having the second aspect ratio, spatial consistency with the image frame from which it was generated, and temporal consistency with neighboring outpainted frames in the video.

14. The electronic device of claim 8, wherein the processor is further configured to:
obtain the image frames having the first aspect ratio in real time;
select an earliest of the obtained image frames as the condition frame;
generate, from a neighboring subsequently obtained image frame based on the video outpainting model and the outpainted condition frame, the outpainted target frame having the second aspect ratio, spatial consistency with the image frame from which it was generated, and temporal consistency with the outpainted condition frame; and
generate, from each other subsequently obtained image frame based on the video outpainting model and the outpainted target frame, a subsequent outpainted target frame having the second aspect ratio, spatial consistency with the image frame from which it was generated, and temporal consistency with the neighboring outpainted target frame.

15. A non-transitory computer readable medium containing instructions that when executed cause at least one processor of an electronic device to:

obtain image frames that comprise a video, each of the image frames having a first aspect ratio;

select at least one of the image frames as a condition frame;

generate, from each condition frame based on an image outpainting model, an outpainted condition frame that has a second aspect ratio different from the first aspect ratio; and generate, from at least one of remaining image frames based on a video outpainting model and the outpainted condition frames, an outpainted target frame that has the second aspect ratio, each outpainted target frame having spatial consistency with the image frame from which it was generated and temporal consistency with neighboring outpainted frames in the video.

16. The non-transitory computer readable medium of claim 15, further containing instructions that when executed cause the at least one processor to:

group the image frames having the first aspect ratio into image sets that each correspond to a scene of the video;

select the at least one of the image frames from one of the image sets as the condition frame, wherein the condition frame corresponds to the image set;

generate, from each condition frame that corresponds to the image set based on the image outpainting model, the outpainted condition frame that has the second aspect ratio, wherein the outpainted condition frame corresponds to the image set; and generate, from at least one of the remaining image frames from the image set based on the video outpainting model and the outpainted condition frames corresponding to the image set, the outpainted target frames, each outpainted target frame corresponding to the image set and having spatial consistency with the image frame from which it was generated and temporal consistency with neighboring outpainted frames in the scene corresponding to the image set.

17. The non-transitory computer readable medium of claim 16, further containing instructions that when executed cause the at least one processor to:

generate, for each image set, a text summary of the corresponding scene of the video; and generate, from each condition frame that corresponds to the image set based on the image outpainting model and the text summary, the outpainted condition frame.

18. The non-transitory computer readable medium of claim 17, further containing instructions that when executed cause the at least one processor to:

generate the outpainted target frames corresponding to the image set from the at least one of the remaining image frames from the image set based on the video outpainting model, the outpainted condition frames corresponding to the image set, and the text summary.

19. The non-transitory computer readable medium of claim 15, wherein:

the image frames are in temporal order, and the non-transitory computer readable medium further contains instructions that when executed cause the at least one processor to generate, from the at least one remaining image frame based on the video outpainting model, the outpainted condition frames, and relative temporal locations of the outpainted condition frames and the at least one remaining image frame, the outpainted target frame.

20. The non-transitory computer readable medium of claim 15, further containing instructions that when executed cause the at least one processor to:

after generating at least one of the outpainted target frames, generate another outpainted target frame from at least one of the other remaining image frames based on the video outpainting model, the outpainted condition frames, and the outpainted target frames, the other outpainted target frame having the second aspect ratio, spatial consistency with the image frame from which it was generated, and temporal consistency with neighboring outpainted frames in the video.

* * * * *